United States Patent [19]

Cohen

[11] Patent Number: 6,161,075

[45] Date of Patent: Dec. 12, 2000

[54] METHOD FOR DETERMINING THE ACCURACY OF MEASURED ENVIRONMENTAL DATA PARAMETERS

[75] Inventor: Douglas Lent Cohen, Fort Wayne, Ind.

[73] Assignee: ITT Manufacturing Enterprises, Inc., Wilmington, Del.

[21] Appl. No.: 09/112,543

[22] Filed: Jul. 9, 1998

[51] Int. Cl.[7] ........................................................ G06F 19/00
[52] U.S. Cl. ....................................................... 702/3
[58] Field of Search ............................ 702/3, 4; 374/109

[56] References Cited

U.S. PATENT DOCUMENTS

| | | |
|---|---|---|
| 4,410,282 | 10/1983 | Leger et al. . |
| 4,499,470 | 2/1985 | Stacey . |
| 4,611,929 | 9/1986 | Holyer . |
| 5,612,601 | 3/1997 | Gallegos et al. . |

OTHER PUBLICATIONS

Prabhakara, et al., "Estimation od Sea Surface Temperature Form Remote Sensing in the 11–to 13$\mu$m Window Region", Journal of Geophysical Research, vol. 79, No. 33, pp. 5039–5044, Nov. 20, 1974.

McMillin, "Estimation of Sea Surface Temperatures From Two Infrared Window Measurements With Different Absorption", Journal of Geophysical Research, vol. 80, No. 36, pp. 5113–5117, Dec. 20, 1975.

Roberts, et al., "Infrared Continuum Absorption by Atmospheric Water Vapor in the 8–12–$\mu$m Window", Applied Optics, vol. 15, No. 9, pp. 2085–2090, Sep. 1976.

McMillin, et al., "Theory and Validation of the Multiple Window Sea Surface Temperature Technique", Journal of Geophysical Research, vol. 89, No. C3, pp. 3655–3661, May 20, 1984.

Walton, "Nonlinear Multichannel Algorithms for Estimating Sea Surface Temperature with AVHRR Satellite Data", Journal of Applied Science, vol. 27, No. 2, pp. 115–124, Feb. 1988.

d'Entremont, et al., "Retrieval of Cirrus Radiative Properties and Altitudes Using Multichannel Infrared Data", Fifth Conference on Satellite Meterology and Oceanography, pp. 4–9, Sep. 3–7, 1990.

d'Entremont, et al., "Retrieval of Cirrus Radiative and Spatial Properties Using Independent Satellite Data Analysis Techniques", Sixth Conference on Satellite Meterology and Oceanography, pp. 17–20, Jan. 5–10, 1992.

d'Entremont, et al., "Retrieval of Cirrus Radiative and Spatial Properties Using Coincident AVHRR and HIRS Satellite Data", SPIE–The International Society of for Optical Engineering, vol. 1934, pp. 180–196.

Ou, et al., "Remote Sensing of Cirrus Cloud Parameters Using Advanced Very–High–Resolution Radiometer 3.7–and 10.9–$\mu$m Channels", Applied Optics, vol. 32, No. 12, pp. 2171–2180, Apr. 20, 1993.

Kerekes, "A Retrieval Error Analysis Technique for Passive Infrared Atmospheric Sounders", Technical Report 978, Lincoln Laboratory, Jul. 8, 1993.

*Primary Examiner*—Donald E. McElheny, Jr.
*Attorney, Agent, or Firm*—Saul Elbaum

[57] ABSTRACT

A method of estimating expected errors of environmental data parameters based on radiance measurements obtained from visible infra red radiometric satellite sensors (VIIRS) orbiting the earth, comprising the steps of: obtaining N radiance measurements of a surface body $I_1, \ldots, I_N$ defining matrix I depending on p unknown surface and atmospheric parameters $T_i, \ldots T_p$, defining a matrix T; generating a forward model $I=f(T)$ for obtaining the I radiance measurements from the p parameters; choosing an initial set of values for the p parameters and linearizing $f(T)$ about the initial values to obtain a linearized forward $I=s+H\theta$ as $f_i(T_{01}, T_{02}, \ldots T_{0p}) + \Sigma H_{ij}\theta_j$ where $I=1,2, \ldots N$ and $\theta_j = T_{oj}$ and $H_{ij} = \delta f_i / \delta T_j$ and where $\theta$ is a column matrix $\theta_1, \ldots \theta_p$ and H is a matrix of $H_{ij}$ values; adding measurement noise vector w of noise values to the forward model; determining the covariance of the measurement noise w to obtain a covariance matrix C; and manipulating the matrices H and C according to the equation $C_{EDR} = (H^T C^{-1} H)^{-1}$ to obtain matrix element $C_{EDR}$ indicative of the expected errors in the values of $T_1, \ldots T_p$ parameters.

20 Claims, 11 Drawing Sheets

SATELLITE SENSOR

N MEASUREMENTS

RADIANCE LEAVING TOP OF ATMOSPHERE
IS $B(v,T_s)\mathcal{T}(v,atm) + B(v,T_a)[1-\mathcal{T}(v,ATM)]$
WHERE B IS THE PLANCK RADIANCE FUNCTION CLOUDLESS ATMOSPHERE AT AN
EFFECTIVE TEMPERATURE $T_a$
HAVING A TRANSMISSION COEFFICIENT
$\mathcal{T}(v,atm)$ AND AN EMISSIVITY
$[1-\mathcal{T}(v,atm)]$ SEA SURFACE AT TEMPERATURE $T_s$
AND EMISSIVITY = 1

SATELLITE SENSOR

N MEASUREMENTS

UPWARD RADIANCE $I = (1-\mathcal{E})I_G + \mathcal{E}B$
ABOVE CIRRUS CLOUDS
[B IS PLANCK RADIANCE]

CIRRUS CLOUD LAYER OF EMISSITY $\mathcal{E}$

UPWARD RADIANCE $I_G$ FROM
BENEATH CIRRUS CLOUDS

FIG.9

TABLE I

| WAVENUMBER (in cm⁻¹) | (1-t)MIDWINTER / (1-t)MIDSUMMER | (1-t)TROPICAL / (1-t)MIDSUMMER |
|---|---|---|
| 820 | 0.1722 | 1.516 |
| 824 | 0.2111 | 1.455 |
| 830 | 0.1585 | 1.5395 |
| 834 | 0.1563 | 1.5422 |
| 840 | 0.2926 | 1.2935 |
| 844 | 0.1778 | 1.5399 |
| 850 | 0.3206 | 1.3214 |
| 854 | 0.2854 | 1.2988 |
| 860 | 0.1601 | 1.5233 |
| 864 | 0.2094 | 1.4512 |
| 870 | 0.2377 | 1.4592 |
| 874 | 0.1606 | 1.5769 |
| 880 | 0.2265 | 1.4481 |
| 884 | 0.2498 | 1.3944 |
| 890 | 0.2033 | 1.4532 |
| 894 | 0.1666 | 1.5893 |
| 900 | 0.1590 | 1.5987 |
| 904 | 0.1610 | 1.5901 |
| 910 | 0.2551 | 1.4190 |
| 914 | 0.1844 | 1.5252 |
| 920 | 0.1830 | 1.5576 |
| 924 | 0.2439 | 1.4645 |
| 930 | 0.2084 | 1.6343 |
| 934 | 0.1871 | 1.5835 |
| 940 | 0.1941 | 1.5507 |
| 944 | 0.2061 | 1.5329 |
| 950 | 0.2142 | 1.5527 |
| 954 | 0.2372 | 1.4610 |
| 960 | 0.1606 | 1.5644 |
| 964 | 0.1839 | 1.6098 |
| 970 | 0.2343 | 1.5030 |
| 974 | 0.2667 | 1.4312 |
| 980 | 0.2463 | 1.5309 |
| 984 | 0.2532 | 1.4981 |
| 990 | 0.3177 | 1.4707 |

TABLE 2    FIG.10

| ATMOSPHERE | (SLOPE IN cm)/(DIMENSIONLESS y-INTERCEPT) |
|---|---|
| TROPICAL | $-7.987 \times 10^{-4}$ cm |
| MIDLATITUDE SUMMER | $-8.281 \times 10^{-4}$ cm |
| MIDLATITUDE WINTER | $-7.993 \times 10^{-4}$ cm |

TABLE 3
SEA-SURFACE ERROR BASED ON VIIRS POINT DESIGN

| $T_S$ (IN DEG K) | 290 | 295 | 300 | 305 | 310 |
|---|---|---|---|---|---|
| $\Delta T_S$ (IN DEG K) | 0.59 | 0.56 | 0.52 | 0.50 | 0.47 |

FIG.11

TABLE 4
SEA-SURFACED ERROR BASED ON AVHRR SPECIFICATIONS

| $T_S$ (IN DEG K) | 290 | 295 | 300 | 305 | 310 |
|---|---|---|---|---|---|
| $\Delta T_S$ (IN DEG K) | 0.78 | 0.72 | 0.68 | 0.65 | 0.61 |

FIG.12

TABLE 5    FIG.13

| BAND 3 | BAND 4 |
|---|---|
| $V_{3a}, V_{3b} = 2545$ cm$^{-1}$, 2817 cm$^{-1}$ | $V_{4a}, V_{4b} = 885$ cm$^{-1}$, 971 cm$^{-1}$ |
| NEdT = 0.2 DEG K AT 271 DEG K | NEdT = 0.1 DEG K AT 293 DEG K |
| BAND ERROR $\sigma_3 = \pm 4.525 \times 10^{-8}$ watt/cm$^2$/sr | BAND ERROR $\sigma_4 = \pm 1.364 \times 10^{-6}$ watt/cm$^2$/sr |

TABLE 6

| PARTICLE SIZE L (in m) | ERROR IN L (in m) | % ERROR IN L |
|---|---|---|
| 41.1 | 1.37 | 3.34 |
| 46.1 | 1.41 | 3.07 |
| 51.3 | 1.51 | 2.94 |
| 57.0 | 1.66 | 2.91 |
| 63.3 | 1.86 | 2.94 |
| 70.4 | 2.12 | 3.01 |
| 78.5 | 2.43 | 3.09 |
| 87.8 | 2.79 | 3.18 |

FIG.14

METHOD FOR DETERMINING THE ACCURACY OF MEASURED ENVIRONMENTAL DATA PARAMETERS

FIELD OF THE INVENTION

The present invention relates generally to satellite radiometry measurements for measuring environmental data parameters, and more particularly, to a method for determining the accuracy with which instruments providing said radiometry measurements yield the true values of the measured parameters at the earth's surface.

BACKGROUND OF THE INVENTION

There are certain phenomena on our earth which have great significance from military and/or commercial points of view. One such phenomenon is the water temperature of the oceans or other large bodies of water. Knowing the temperature of the water over large areas is of importance for military purposes, as well as from a commercial point of view, since ocean water temperature affects commercial fishing. Theoretically, one can take direct measurements of the water temperature at specific locations. However, due to the large surface area of the oceans, taking direct water temperature measurements over any large surface area of hundreds of thousands of square miles is clearly impractical.

Similarly, cloud measurements in general, and more particularly, ice particle size measurements of cirrus clouds, are also important in imaging certain bodies in order to remove or limit interfering clouds from any satellite images, as well as to obtain measurements of precipitation occurring within the atmosphere. Satellite sensor instruments have been used to measure specified radiance of certain ground-based bodies to within a specified error. That is, the satellite sensors themselves make known radiance measurements at the top of the atmosphere of bodies located at the earth's surface, such as water temperature.

However, the goal is to determine a given Environmental Data Record (EDR) or surface parameter to within a specified error. It is therefore crucial to relate the radiance measurement errors, which we know how to predict, to the expected errors in the EDR's. For many EDR's it is relatively easy to create forward models which, given specific values of the EDR parameters, predict the radiance leaving the top of the atmosphere. What is not so easy, however, is to exercise these models over a range of environmental parameters large enough to find the level of radiance error which produces adequate EDR estimates. Fortunately, as will be shown herein, signal processing formulas applied to linearized versions of an EDR forward model, permit one to proceed directly from the known radiance error (i.e. the satellite sensor noise of the point design) to the expected errors in the EDR. These formulas also specify algorithms, based on the linearized forward model, which can be used to estimate EDR's from their associated radiances.

As will be shown in the detailed description below, a basic statistical methodology for connecting EDR errors to radiance measurement errors will be presented in Section 1, followed by two examples in Sections 2 and 3 showing how to deal with VIIRS-based EDR's when the forward models can be written down algebraically. The Sea-Surface Temperature EDR analyzed in Section 2 shows that the predicted EDR error using the method disclosed herein matches NOAA's past experience. This provides support that the statistical methodology works as expected. The cirrus cloud EDR analyzed in Section 3 shows how the methodology can be used to analyze the performance different versions of an EDR algorithm. Section 4 shows how to handle EDR's where only a computerized version of the forward model (such as MODTRAN or FASCODE) exists. The technique described in Section 4 applies equally well, of course, to those VIIRS-based EDR's where only computerized versions of the forward model are easily available.

SUMMARY OF THE INVENTION

It is an object of the present invention to provide a method for estimating expected errors of environmental data parameters based on radiance measurements obtained from visible infra red radiometric satellite sensors (VIIRS) orbiting the earth, comprising the steps of obtaining N radiance measurements of a surface body $I_1, \ldots I_N$ defining matrix I depending on p unknown surface and atmospheric parameters $T_i, \ldots T_p$, defining a matrix T; generating a forward model $I=f(T)$ for obtaining the I radiance measurements from the p parameters, where $f(T)$ comprises a matrix; choosing an initial set of values for the p parameters and linearizing $f(T)$ about the initial values to obtain a linearized forward $I=s+H\theta$ as $f_i(T_{01}, T_{02}, \ldots T_{0p})+\Sigma H_{ij}\theta_j$ where $I=1,2, \ldots N$ and $\theta_j=T_j-T_{oj}$ and $H_{ij}=\delta f_i/\delta T_j$ and where $\theta$ is a column matrix $\theta_1, \ldots \theta_p$ and H is a matrix of $H_{ij}$ values; adding measurement noise vector w of noise values to the forward model; determining the covariance of the measurement noise w to obtain a covariance matrix C; and manipulating the matrices H and C according to the equation $C_{EDR}=(H^TC^{-1}H)^{-1}$ to obtain matrix element $C_{EDR}$ indicative of the expected errors in the values of $T_1, \ldots T_p$ parameters.

BRIEF DESCRIPTION OF THE DRAWINGS

FIG. 9 contains Table 1 which provides a set a of ratios for midlatitude winter to midlatitude summer and for tropical to midlatitude summer temperature values a function of wavenumber.

FIG. 10 contains Table 2 which provides a ration of the slope to the y-intercept from the value of Table 1.

FIG. 11 contains Table 3 which lists the expected errors in sea-surface temperature $\Delta T$, based on the VIIRS point design, for different values of the sea-surface temperature.

FIG. 12 contains Table 4 which provides a list of expected sea-surface errors based on AVHRR specifications for different values of sea-surface temperature.

FIG. 13 contains Table 5 which illustrates parameter values representing bands 3 and 4 of the VIIRS point design for the 3.7 $\mu$m bands of the 10–12 $\mu$m bands.

FIG. 14 contains Table 6 which represents ice particle size measurement values, and the absolute and relative errors associated with those measurements over a range of $T_C$ temperature values.

DETAILED DESCRIPTION OF THE INVENTION

Section 1: The Statistical Methodology

Figure 6:
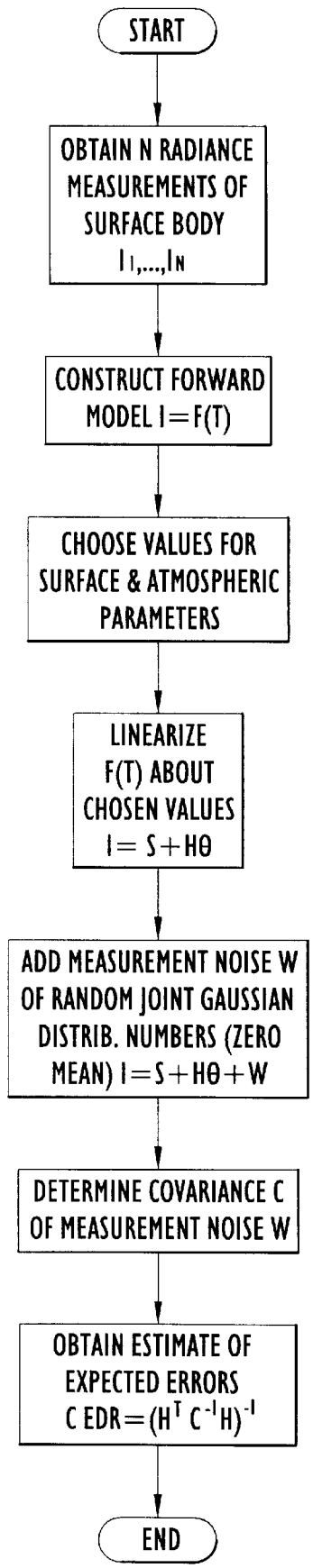
FIG. 6 provides an overall flow chart for estimating the expected errors of environmental data parameters based on radiance measurements from VIIRS sensors according to the present invention.

With reference now to FIG. 6, as part of the statistical methodology for VIIRS-based EDR parameters, we suppose there exist N measurements (e.g. N in-band sensor signals) which depend on p unknown atmospheric and surface parameters. In order to make the mathematical notation compact the N measurements $I_1, I_2, \ldots, I_N$ are stacked in a column and treated as a column vector $\bar{I}$.

$$\bar{I} = \begin{pmatrix} I_1 \\ I_2 \\ \vdots \\ I_N \end{pmatrix} \quad (1.1a)$$

The p unknown surface and atmospheric parameters $T_1, T_2, \ldots, T_p$ are treated similarly.

$$\bar{T} = \begin{pmatrix} T_1 \\ T_2 \\ \vdots \\ T_p \end{pmatrix} \quad (1.1b)$$

In general the $\bar{T}$ are the EDR parameters which are to be determined from the satellite sensor measurements $\bar{I}$. For example, there may be N=2, p=2 for a sea-surface temperature EDR, where $I_{1,2}$ are two radiance measurements in the 10–12 $\mu$m atmospheric window, and $T_{1,2}$ are respectively the sea-surface temperature and an atmospheric transmission-emission parameter as shown in equations (2.8a–d) below. Note that for CrIS-based atmospheric profiles there may be N≅1500 for the spectral channels and p≅70 for a 35-layer atmospheric model with temperature and water-vapor concentrations to be determined for each of the layers.

The forward model going from $\bar{T}$ to $\bar{I}$ can be written as $$\bar{I} = \bar{f}(\bar{T})$$

where $\bar{f}(\bar{T})$ stands for a column vector of functions all depending on $\bar{T}$.

$$\bar{f}(\bar{T}) = \begin{pmatrix} f_1(\bar{T}) \\ f_2(\bar{T}) \\ \vdots \\ f_N(\bar{T}) \end{pmatrix} = \begin{pmatrix} f_1(T_1, T_2, \ldots, T_p) \\ f_2(T_1, T_2, \ldots, T_p) \\ \vdots \\ f_N(T_1, T_2, \ldots, T_p) \end{pmatrix} \quad (1.2b)$$

The next step is to choose a standard set of values for the surface and atmospheric parameters.

$$\bar{T}_0 = \begin{pmatrix} T_{01} \\ T_{02} \\ \vdots \\ T_{0p} \end{pmatrix} \quad (1.3a)$$

and linearize $f_1, f_2, \ldots, f_N$ about these values.

$$f_i(T_1, T_2, \ldots, T_p) \cong f_i(T_{01}, T_{02}, \ldots, T_{0p}) + \sum_{j=1}^{p} H_{ij} \theta_j \quad (1.3b)$$

where $i=1, 2, \ldots, N,$ $\theta_j = T_j - T_{0j},$ \quad (1.3c)

and $$H_{ij} = \frac{\partial f_i}{\partial T_j}\bigg|_{\bar{T}=\bar{T}_0}. \quad (1.3d)$$

If one defines $$\bar{\theta} = \begin{pmatrix} \theta_1 \\ \theta_2 \\ \vdots \\ \theta_p \end{pmatrix}, \quad (1.4a)$$

$$\bar{s} = \begin{pmatrix} f_1(T_{01}, T_{02}, \ldots, T_{0p}) \\ f_2(T_{01}, T_{02}, \ldots, T_{0p}) \\ \vdots \\ f_N(T_{01}, T_{02}, \ldots, T_{0p}) \end{pmatrix}, \quad (1.4b)$$

and $H$=matrix of $H_{ij}$ values \quad (1.4c)

then the linearized forward model in equation (1.2a) can be written as $$\bar{I} = H\bar{\theta} + \bar{s} \quad (1.5)$$

Measurement noise associated with the N radiance measurements is represented as a vector $\bar{w}$ of N random numbers $w_1, w_2, \ldots, w_N$ having a jointly gaussian probability distribution.

The probability that $w_1$ has a value between $w_1$ and $w_1+dw_1$, $w_2$ has a value between $w_2$ and $w_2+dw_2, \ldots, w_N$ and $w_N+dw_N$ is $p(w_1, w_2, \ldots w_N) dw_1 dw_2 \ldots dw_N$ where $$p(w_1, w_2, \ldots, w_N) = \frac{1}{\left(\sqrt{2\pi}\right)^N \sqrt{\det \bar{C}}} e^{-\frac{1}{2}(\bar{w})^T \bar{C}(\bar{w})} \quad (1.7a)$$

Note that this is a zero-mean gaussian distribution. In equation (1.7a) C is the covariance matrix of the $w_1, W_2, \ldots, w_N$ random numbers, det $\bar{C}$ is the determinant of C, and $\bar{w}^T = (w_2 \; w, \ldots_N w)$ is the transpose of $\bar{w}$ (which is, of course, a row vector). The ij'th component of matrix C is $$(\tilde{C})_{ij} = C_{ij} = E((w_i - E(w_i)) \cdot (w_j - E(w_j))) = E(w_i w_j) \quad (1.7b)$$

where E stands for the usual expectation operator. In the last step of equation (1.7b) we use that $E(w_i)=0$ for all values of I because the $w_i$ obey a zero-mean gaussian distribution. For any two random numbers $r_1$, $r_2$ (which do not necessarily obey a zero mean distribution) we have $$E(r_{1,2}) = \text{mean value of } r_{1,2} \quad (1.7c)$$

$$E((r_{1,2} - E(r_{1,2}))^2) = \text{variance of } r_{1,2} \quad (1.7d)$$

$$E((r_1 - E(r_1)) \cdot (r_2 - E(r_2))) = \text{covariance of } r_1 \text{ and } r_2 \quad (1.7e)$$

One can then construct a complete linearized forward model, including measurement noise, by adding $\overline{w}$, the vector or random measurement errors, to the right-hand side of equation (1.5) to obtain:

$$\overline{I} = \tilde{H}\overline{\theta} + \overline{s} + \overline{w}tm \quad (1.8)$$

The error in the estimate of $\theta_1, \theta_2, \ldots, \theta_p$ is then given by the covariance matrix $$\tilde{C}_{EDR} = (\tilde{H}^T \tilde{I}^{-1} \tilde{H})^{-1} \quad (1.9a)$$

where the "T" superscript denotes the matrix transpose and the "−1" superscript denotes the matrix inverse. The covariance matrix $C_{EDR}$ follows from the theorem established in Steven M. Kay's, *Fundamentals of Statistical Signal Processing: Estimation Theory*, page 97, PTR Prentiss-Hall, Inc., Englewood Cliff, N.J., 1993 and incorporated herein by reference. The matrix elements of $C_{EDR}$ specify the expected errors in the values of $\theta_1, \theta_2, \ldots \theta_p$, which is the same as the expected errors in the values of $T_1, T_2, \ldots T_p$ because the $\theta$'s are just the differences of the p surface and atmospheric parameters from their standard values (see equation (1.3c)). The minimum-variance, unbiased estimator of $\overline{\theta}$ given noise-contaminated values of $\overline{I0}$ (the noise amplitude is specified by the covariance matrix C) and known values of $\overline{s}$ is $$\overline{\theta}_{estimate} = (\tilde{H}^T \tilde{C}^{-1} \tilde{H})^{-1} \tilde{H}^T \tilde{C}^{-1} (\overline{I} - \overline{s}) \quad (1.91b)$$

Equation (1.9a) specifies the variance, that is, the error, in the estimate of $\overline{\theta}$ given by equation (1.9b). If the forward model in equation (1.8) is strictly true rather than a linearized version of equation (1.2a), then equation (1.9b) is the best possible way to estimate $\overline{\theta}$ and equation (1.9a) gives the lowest possible error with which $\overline{\theta}$ can be estimated.

The constant $\overline{s}$ in equation (1.8) and (1.9b) is a known quantity so we can always define a new set of measurements $\overline{D}$ such that $$\overline{D} = \overline{I} - \overline{s} \quad (1.10a)$$

and $$\overline{D} = \tilde{H}\overline{\theta} + \overline{w} \quad (1.10b)$$

If $\overline{\theta}$ has been measured often enough in the past that one can estimate the probability that the next value of $\overline{\theta}$ will take on any particular value, and if it is known that this probability distribution for $\overline{\theta}$ looks gaussian with a covariance matrix $C_\theta$ such that $$(\tilde{C}_\theta)_{ij} = E((\theta_i - E(\theta_i))(\theta_j - E(\theta_j))). \quad (1.11a)$$

then it is also known that the expected error in our estimate of $\overline{\theta}$ will now be $$\tilde{C}_{EDR} = (\tilde{C}_\theta^{-1} + \tilde{H}^T \tilde{C}^{-1} \tilde{H})^{-1} \quad (1.11b)$$

when using the estimation formula (see page 391 of *Fundamentals of Statistical Processing: Estimation Theory*)

$$\overline{\theta}_{estimate} = E(\overline{\theta}) + [(\tilde{C}_0^{-1} + \tilde{H}^T \tilde{C}^{-1} \tilde{H})^{-1} \tilde{H}^T \tilde{C}^{-1}] \cdot (\overline{D} - \tilde{H} \cdot E(\overline{\theta})) \quad (1.11c)$$

If the $\overline{D}$ values are unknown so as to be unable to provide information regarding the values of $\overline{\theta}$, one may proceed by obtaining a best estimate as to the true values of $\overline{\theta}$ as $E(\overline{\theta}) = (E(\overline{\theta}_1), E(\overline{\theta}_2), \ldots, E(\overline{\theta}_3))^T$, the mean of the set of previously-determined $\overline{\theta}$ values. However, we do in fact have the $\overline{\theta}$ values generated by the true $\overline{\theta}$ values, the right-hand side of equation (1.11c) uses the information provided by the $\overline{D}$ values to adjust the already known values of $E(\overline{\theta})$ to get a better estimate of $\overline{\theta}$. In equations (1.3a,b,c) above, we can choose to linearize the forward model about a $\overline{T}_0$ vector such that $E(\overline{\theta})=0$ (indeed that would be the most natural way of linearizing the forward model). This simplifies equation (1.11c) to $$\overline{\theta}_{estimate} = [(\tilde{C}_\theta^{-1} + \tilde{H}^T \tilde{C}^{-1} \tilde{H})^{-1} \overline{H}^T \overline{C}^{-1}] \cdot \overline{D} \quad (1.11d)$$

Equation (1.11 d) represents a standard linear algorithm used to retrieve temperature and water vapor from a set of FTIR spectra. The algorithm of this type is disclosed in pages 12–14 of J. P. Kerekes, *A Retrieval Error Analysis Technique for Passive Infrared Atmospheric Sounders*, Lincoln Laboratory MIT, Technical Report 978, Jul. 8, 1993, ESC-TR-92-204, incorporated herein by reference. Note that when (1.11d) is used, equation (1.11b) automatically gives us the expected error in the retrieved temperature and water-vapor profiles. If no information is available about which temperatures and water-vapor concentrations are most likely to occur, then all the elements of $C_\theta$ are zero and equations (1.11b,d) reduce to (1.9a,b).

Section 2: Sea-Surface Temperature

A forward model for determining the sea-surface temperature from satellite observations of a cloud-free region of the ocean is given as $$I(v, \text{atm}) = B(v, T_s) \cdot \tau(v, \text{atm}) + B(v, T_a) \cdot [1 - \tau(v, \text{atm})] \quad (2.1)$$

where I is the radiance leaving the earth's atmosphere (in watt/cm$^2$/sr/cm$^{-1}$), $T_s$ is the sea-surface temperature (in deg K), $T_a$ is an effective temperature (in deg K) describing the atmospheric self-radiance in the 10–12 $\mu$m window region, $\tau$ is the dimensionless atmospheric transmission from the ocean surface to the top of the atmosphere, v is a wavenumber (in cm$^{-1}$) in the 10–12 $\mu$m window region, "atm" is shorthand for a long list of atmospheric parameters determining the value of the transmittance $\tau$ at wavenumber v, and B(v,T) is the Planck function $$B(v,T) = C_1 v^3 P(C_2 v T^{-1}) \quad (2.2a)$$

where $$C_1 = 1.191 \times 10^{-12} \text{watt}/\text{cm}^2/sr/(\text{cm}^{-1})^4, \quad (2.2b)$$

$$C_2 = 1.439 \text{ deg K}/\text{cm}^{-1},$$

and $$P(C_2 v T^{-1}) = \frac{1}{e^{C_2 v T^{-1}} - 1}.$$

Figure 1:
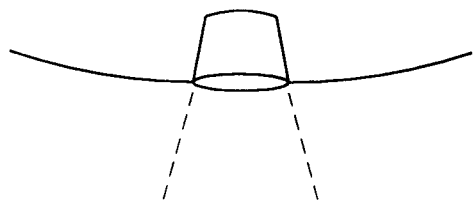
FIG. 1 illustrates a standard two-layer transmission-emission model for the ocean surface and atmosphere according to the present invention.
Figure 1:
Figure 1:
Figure 2:
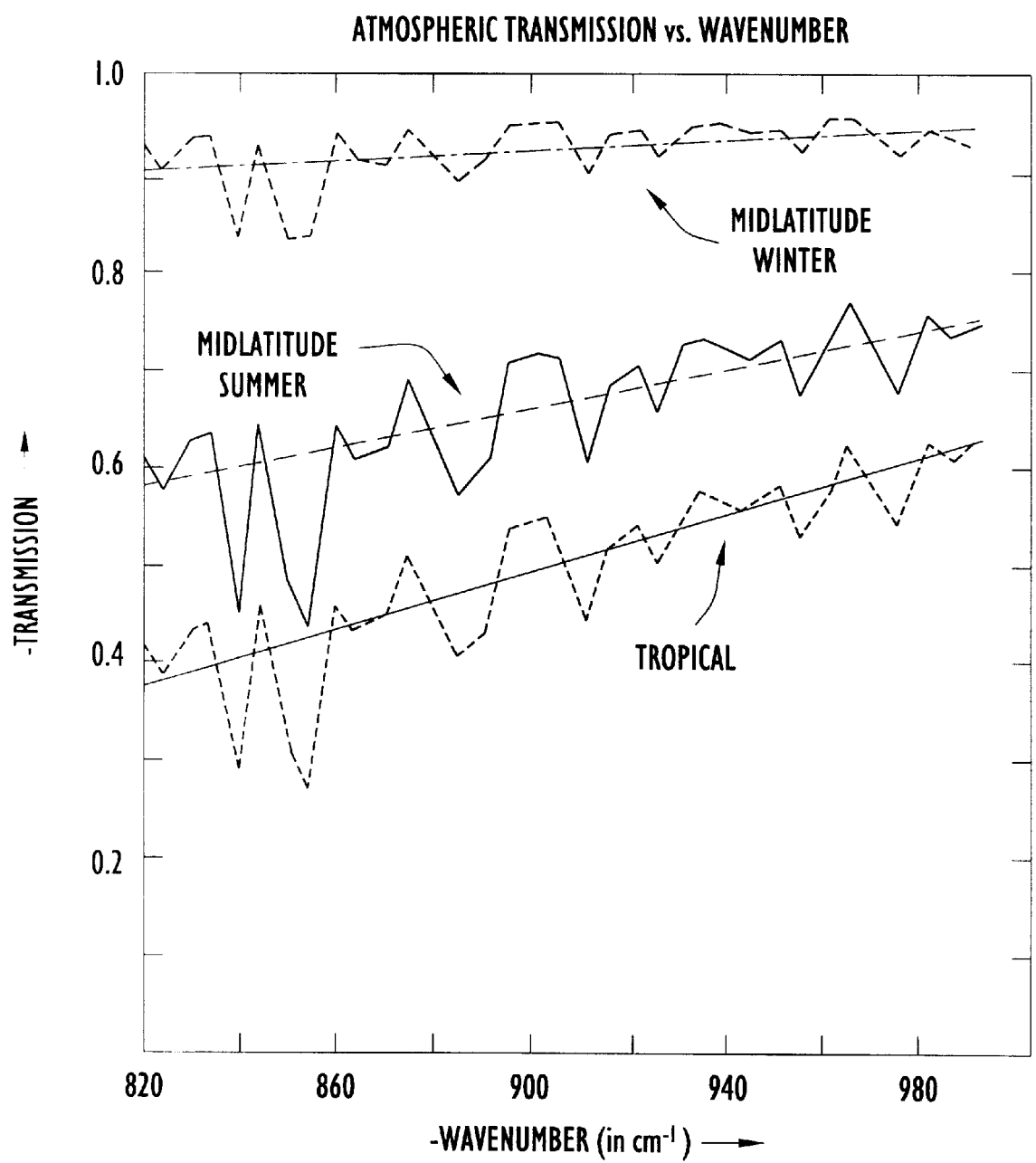
FIG. 2 illustrates the transmission curves as a function of wavenumber listed in Table 1 and shows how well they match the straight-line approximations generated by the values of M and $A_{atm}$.

Equation (2.1) represents a standard two-layer transmission-emission model for the ocean surface and atmosphere as shown in FIG. 1. Empirical data has shown that $T_a$ varies by less than 1 deg K in the 10–12 $\mu$m window region, so the dependence of $T_a$ on v can be neglected in equation (2.1). Another good approximation is that in the 10–12 $\mu$m window $$\tau(v,\text{atm}) \cong 1 - A_{atm} \cdot K(v) \tag{2.3}$$

where K is a function only of wavenumber and the effect of all the atmospheric parameters can be lumped into a single constant $A_{atm}$. As a check to equation (2.3), a MODTRAN simulation run for 35 wavenumbers between 820 cm$^{-1}$ and 990 cm$^{-1}$ has been performed using three different standard atmospheres: tropical, midlatitude summer, and midlatitude winter. Table 1 (FIG. 9) gives the ratios of $[1-\tau(v,\text{atm})]$ for midlatitude winter to midlatitude summer and for tropical to midlatitude summer, and we see that while some correlation exists with the approximation given in (2.3), there are definitely wavenumbers where it does not work very well. We will, however, be interested in wide-bandwidth radiance signals, so we should also examine how well equation (2.3) works as a moving average relationship. Performing a linear regression of $[1-\tau(v,\text{atm})]$ against v for the values of 1-$\tau$ and v given in Table 1 yields the ratio of the slope to the y-intercept as shown in Table 2 (FIG. 10). As one can ascertain, the ratios are very similar for all three atmospheres (in fact they are equal to within 4%). Section 5 shows that this is exactly the result to be expected if equation (2.3) held true, so equation (2.3) can be used with some confidence as long as it is applied only to wide-bandwidth radiance signals. FIG. 2 gives the transmission curves $\tau(v,\text{atm})$ listed in Table 1 and shows how well they match the straight-line approximations generated by the values of M and $A_{atm}$ in equations (2.4a,b).

$$\tau(v,\text{atm}) \cong 1 - A_{atm} \cdot K_L(v) \tag{2.4a}$$

where $$K_L(v) = 1 - M \cdot v \tag{2.4b}$$

for $$M = 8.0 \times 10^{-4} \text{cm},$$

1.8 for standard tropical atm
and
$A_{atm}$=1.2 for standard midlatitude summer atm
0.27 for standard midlatitude winter atm Approximating the function K(v) in equation (2.3) by the straight line $K_L(v)$ given in (2.4b) and substitute (2.4a,b) into equations (2.1) yields.

$$I(v,\text{atm}) = B(v,T_s) + K_L(v) \cdot A_{atm} \cdot [B(v,T_a) - B(v,T_s)] \tag{2.5}$$

From page 5042 of C. Prabhakara, G. Dalu, and V. G. Kunde's article on "Estimation of Sea Surface Temperature From Remote Sensing in the 11- to 13 $\mu$m Window Region", *J. Of Geophysical Research*, vol. 79, No. 33, 1974, pp. 5039–5044, incorporated herein by reference, we know that $T_s$ and $T_a$ are almost always within 10 deg K of each other, so for a given patch of ocean at a specified time of year, the Planck function B(v,T) will only need to be evaluated over a limited range of V and T values. A reasonable range for midlatitude summer is $$285 \text{ deg } K \leq T \leq 315 \text{ deg } K \tag{2.6a}$$

$$800 \text{ cm}^{-1} \leq v \leq 1000 \text{ cm}^{-1} \tag{2.6b}$$

For this range of v and T function $P(C_2vT^{-1})$ can be approximated as $$P(C_2vT^{-1}) \cong \alpha(C_2vT^{-1}) = \Omega \cdot (C_2vT^{-1})^{-n} \tag{2.7a}$$

where $$\Omega = 8.2527 \tag{2.7b}$$

and $$n = 4.4 \tag{2.7c}$$

Figure 3:
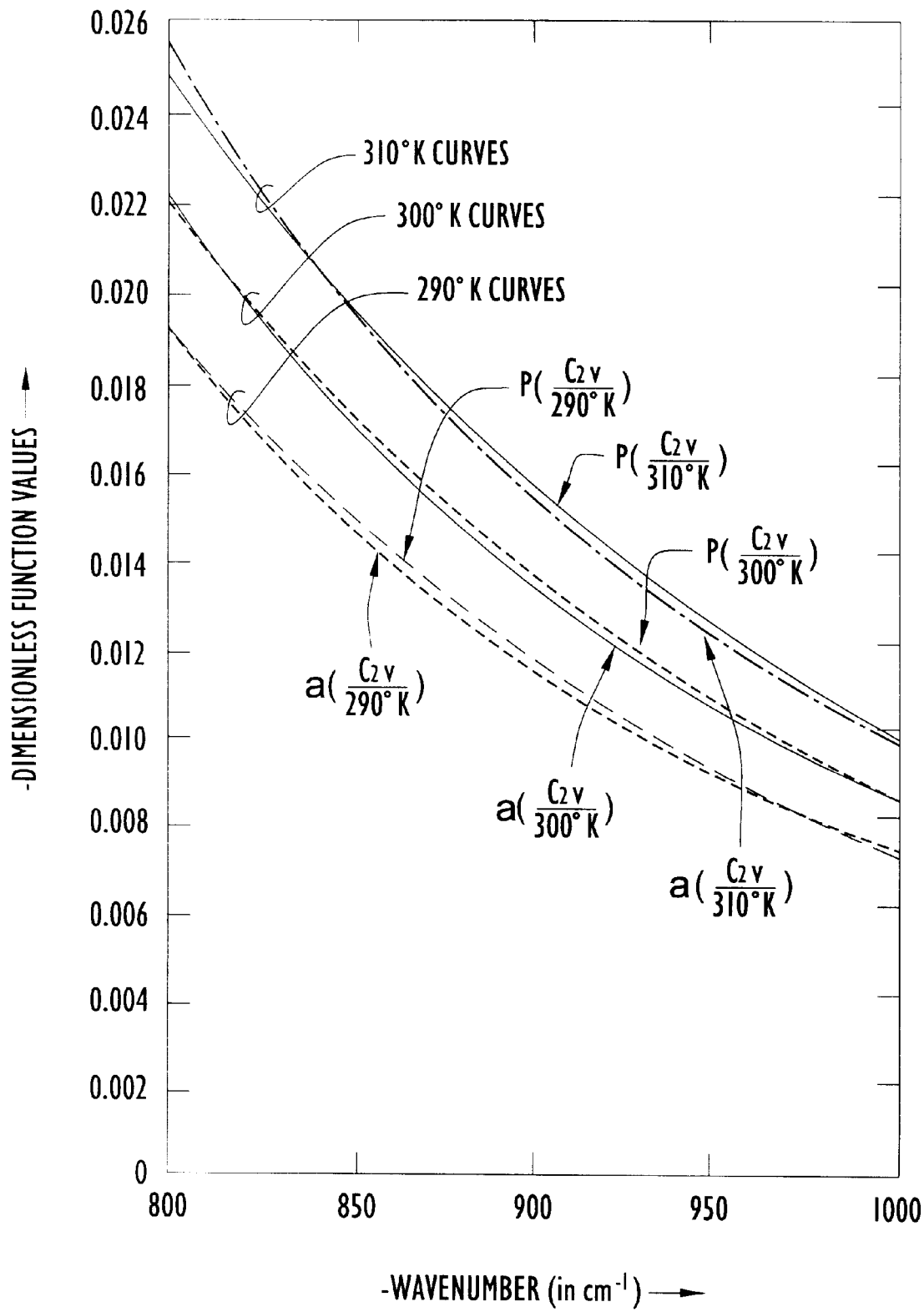
FIG. 3 represents a graph of functions P and $\alpha$ for T=290 deg K., 300 deg K., 310 deg K. and $800 \text{ cm}^{-1} \leq v \leq 1000 \text{ cm}^{-1}$.
Figure 4:
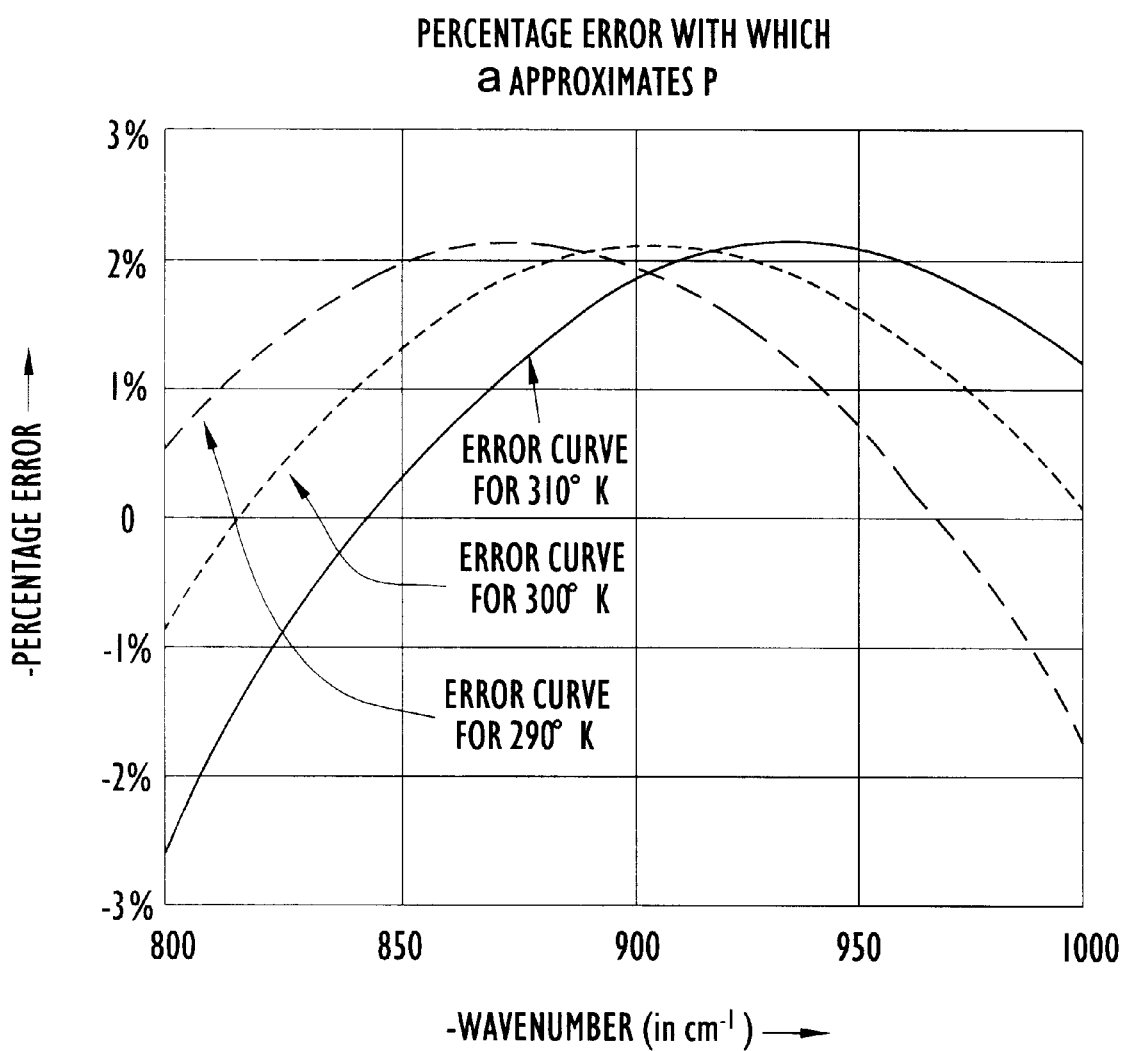
FIG. 4 shows the relative error involved in approximating P by $\alpha$ for three different temperatures.

FIG. 3 shows functions P and $\alpha$ for T=290 deg K, 300 deg K, 310 deg K and 800 cm$^{-1} \leq v \leq 1000$ cm$^{-1}$; one can see that a does a reasonable job of approximating P. FIG. 4 shows the relative error involved in approximating P by $\alpha$, and for the three temperatures graphed in FIG. 3, the relative error is 3% or less. We substitute (2.2a) and (2.7a) into equation (2.5) to get $$I(v,\text{atm}) = C_b v^{3-n} \theta_s + C_B K_L(v) v^{3-n} \theta_a \tag{2.8a}$$

where $$C_B = \Omega C_1 C_2^{-n} \cong 1.98 \times 10^{-12} \text{watt/cm}^2/\text{sr}/(\text{cm}^{-1})^4/(\text{cm-deg}K)^n, \tag{2.8b}$$

$$\theta_s = T_s^n \tag{2.8c}$$

and $$\theta_a = A_{atm} \cdot (T_a^n - T_s^n) \tag{2.8d}$$

Equations (2.8a–d) reduce the nonlinear problem of equation (2.5) into a linear problem in two unknowns: $\theta_s$ the n'th power of the sea-surface temperature, and $\theta_a$ an atmospheric variable describing the combined effect of $T_s$, $T_a$, and $A_{atm}$. Therefore, for this particular VIIRS-based EDR we do not have to linearize the forward model to use equations (1.9a, b), although that could have been done had it turned out to be necessary.

The VIIRS point design specifies two bandwidths in the 10–12 $\mu$m atmospheric window which are labeled band 1 and band 2. Band 1 ranges from wavenumbers $V_{1a}$ to $v_{1b}$ and band 2 ranges from $v_{2a}$ to $v_{2b}$ where $$v_{1a} = 800 \text{ cm}^{-1}, v_{1b} = 870 \text{ cm}^{-1} \tag{2.9a}$$

$$V_{2a} = 885 \text{ cm}^{-1}, v_{2b} = 971 \text{ cm}^{-1} \tag{2.9b}$$

The noise amplitudes in band 1 and 2, based on the point design specification of NedT=0.1 deg K at T=293 deg K, are $\sigma_1$ and $\sigma_2$ respectively where $$\sigma_1 = 1.211 \times 10^{-6} \text{ watt/cm}^2/\text{sr} \tag{2.10a}$$

$$\sigma_2 = 1.284 \times 10^{-6} \text{ watt/cm}^2/\text{sr} \tag{2.10b}$$

One obtains $\sigma_1$ and $\sigma_2$ from the formula (I=1,2)

$$\sigma_i = \int_{v_{ia}}^{v_{ib}} [B(v, 293.1 \deg K) - B(v, 293 \deg K)] dv \tag{2.10c}$$

$$\cong C_B [(293.1 \deg K)^n - (293.0 \deg K)^n] \cdot \left[\frac{v_{ib}^{4-n} - v_{ia}^{4-n}}{4-n}\right]$$

where the second step in equation (2.10c) comes from the approximation for B(v,T) given by equations (2.2a,b) and (2.7a–c).

Integrating equation (2.8a) over bands 1 and 2 gives (I=1,2)

$$I_i = \int_{v_{ia}}^{v_{ib}} I(v, \text{atm}) = \tag{2.11a}$$

$$C_B \theta_s \int_{v_{ia}}^{v_{ib}} V^{3-n} dv + C_B \theta_a \int_{v_{ia}}^{v_{ib}} K_L(v) v^{3-n} dv \text{ or}$$

$$\frac{1}{C_B} \cdot I_i = \theta_s \cdot \left[ \frac{v_{ib}^{4-n} - v_{ia}^{4-n}}{4-n} \right] + \theta_a \cdot \left[ \frac{v_{ib}^{4-n} - v_{ia}^{4-n}}{4-n} - M \cdot \frac{v_{ib}^{5-n} - v_{ia}^{5-n}}{5-n} \right] \tag{2.11b}$$

where equation (2.4b) has been used to go from (2.11a) to (2.11b). Equation (2.1 lb) is written in matrix form as $$\bar{I} = \bar{H}\bar{\theta} \tag{2.12a}$$

where $$\bar{I} = \begin{pmatrix} I_1/C_B \\ I_2/C_B \end{pmatrix}, \tag{2.12b}$$

$$\bar{\theta} = \begin{pmatrix} \theta_s \\ \theta_a \end{pmatrix}, \tag{2.12c}$$

and $$\bar{H} = \begin{bmatrix} F_4(v_{1a}, v_{1b}) & F_4(v_{1a}, v_{1b}) - M \cdot F_5(v_{1a}, v_{1b}) \\ F_4(v_{2a}, v_{2b}) & F_4(v_{2a}, v_{2b}) - M \cdot F_5(v_{2a}, v_{2b}) \end{bmatrix}. \tag{2.12d}$$

with $$F_4(v_a, v_b) = \frac{v_b^{4-n} - v_a^{4-n}}{4-n} \tag{2.12e}$$

and $$F_5(v_a, v_b) = \frac{v_b^{5-n} - v_a^{5-n}}{5-n} \tag{2.12f}$$

The forward model with additive noise $\bar{w} = (w_1, w_2)^T$, where $w_1$ is the random error in band 1 and $w_2$ is the random error in band 2, can be written as $$\bar{I} = \bar{H}\bar{\theta} + \bar{w} \tag{2.13a}$$

From equations (2.10a,b) we see that, assuming gaussian signal noise with independent noise pulses in bands 1 and 2, the noise covariance matrix representing the measurement errors specified by $\bar{w}$ is $$\bar{C} = \begin{bmatrix} \sigma_1^2 & 0 \\ 0 & \sigma_2^2 \end{bmatrix} \tag{2.13b}$$

Equation (2.13a) is identical to equation (1.8) in Section 1 above (with $\bar{s}=0$). Therefore, the $C_{EDR}$ covariance matrix may be written as $$\bar{C}_{EDR} = \bar{H}^T \bar{C}^{-1} \bar{H}^{-1} \tag{2.14}$$

$$= \begin{bmatrix} 3.721 \times 10^{17} (\deg K)^{2n} & -1.240 \times 10^{18} (\deg K)^{2n} \\ -1.240 \times 10^{18} (\deg K)^{2n} & 4.197 \times 10^{18} (\deg K)^{2n} \end{bmatrix}$$

The part of $C_{EDR}$ of interest to the present application is the "1,1" component specifying the expected variance in the sea-surface variable $\theta_s = T_s^n$. The error in $T_s$, called $\Delta t_s$, comes from $$\Delta\theta_s = \sqrt{3.72 \times 10^{17}} (\deg K)^n \tag{2.15a}$$

where $$d\theta_s = n(T_s^{n-1}) dT_s$$

so that $$\Delta T_s \cong \frac{\Delta\theta_s}{nT_s^{n-1}} = \frac{\sqrt{3.72 \times 10^{17}} (\deg K)^n}{nT_s^{n-1}}. \tag{2.15b}$$

Figure 7:
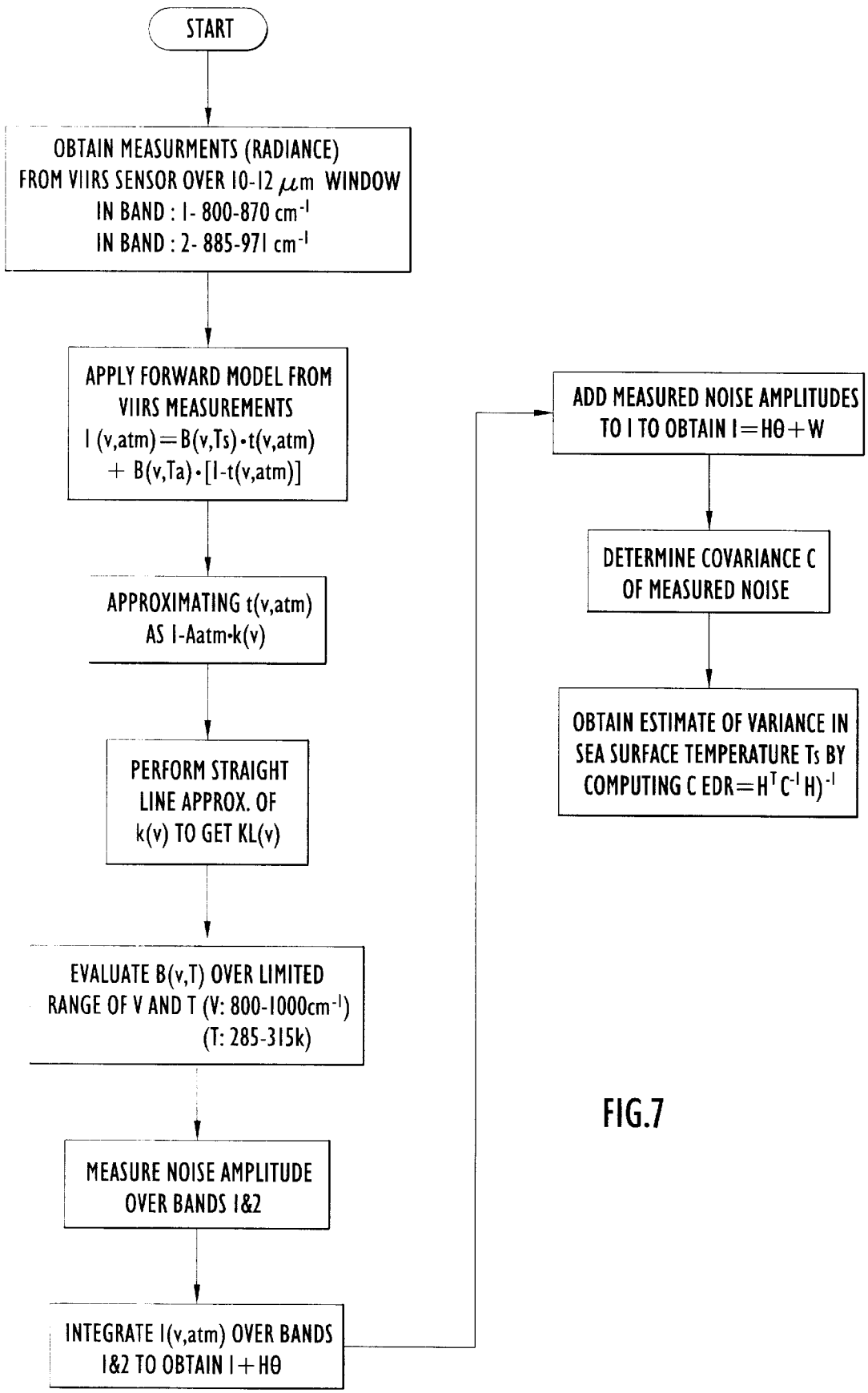
FIG. 7 is a flow chart depicting the steps for predicting errors in sea surface temperature measurements according to the present invention.

Equations (2.7c) and (2.15 b) are used in Table 3 (FIG. 11) to list $\Delta T$, for different values of the sea-surface temperature. The values in Table 3 run from 0.47 deg K to 0.59 deg K and are a good match to NOAA's past experience with AVHRR data (typical errors are 0.5 deg K to 0.7 deg K, see reference 14). This is not surprising because the VIIRS point design closely resembles the AVHRR specifications in the 10–12 $\mu$m atmospheric window. Repeating our calculations for the AVHRR bands in the 10–12 $\mu$m atmospheric window using AVHRR noise specifications, $$\sigma_{1,AVHRR} = 1.470 \times 10^{-6} \text{ watt/cm}^2/sr$$

$$\sigma_{2,AVHRR} = 1.740 \times 10^{-6} \text{ watt/cm}^2/sr$$

the results show that the expected temperature errors range from 0.61 deg K to 0.78 deg K (see Table 4, FIG. 12). Again, there exists a reasonable match to NOAA's past experience in retrieving sea-surface temperatures. As shown in section 6, an algorithm may be implemented to calculate the temperature errors as shown in Tables 3 and 4. A flow chart depicting the above operation is illustrated in FIG. 7.

Section 3: Ice Particle Size in Cirrus Clouds

Figure 8A:
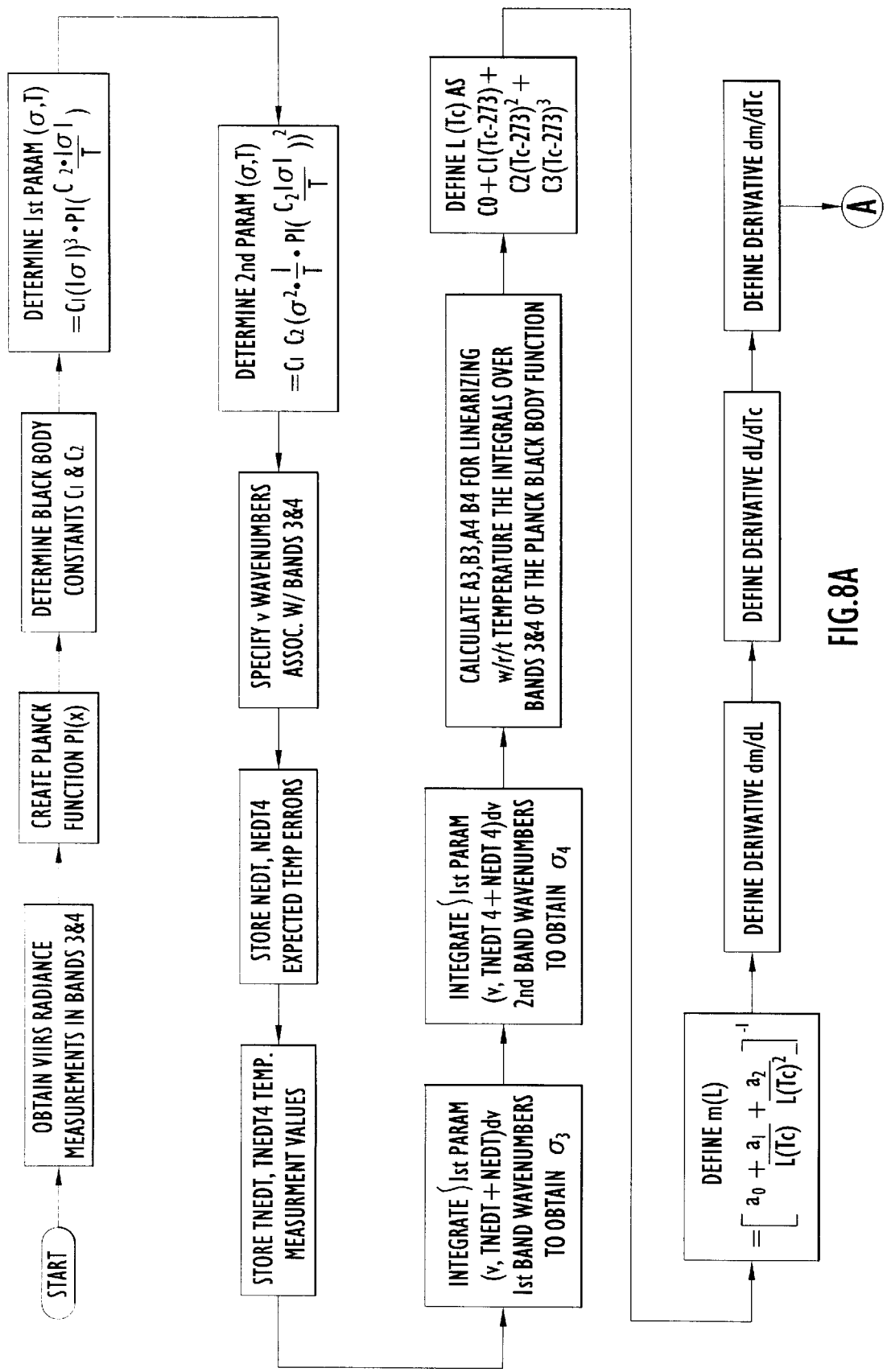
FIGS. 8A–B represent a flow chart depicting a method for estimating error involved in determining ice particle size of cirrus clouds using VIIRS radiance measurements according to the present invention.
Figure 8B:
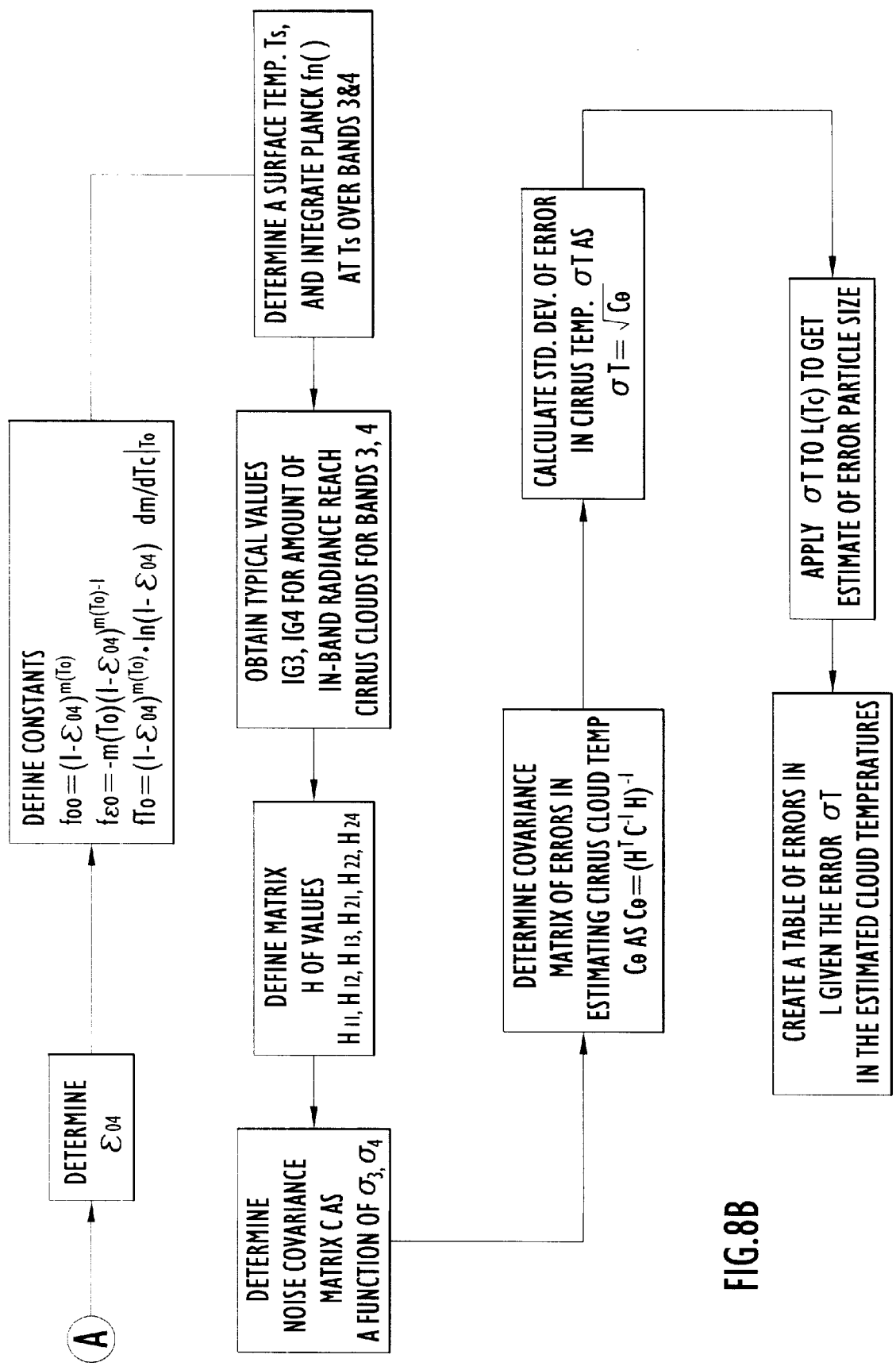

Here there is shown that the statistical methodology can be used to investigate the accuracy of different versions of an EDR algorithm. In this analysis, the processing steps involve directly linearizing the forward model to obtain an accurate error estimation rather than re-arranging into linear format as was done in the Section 2 example above. Note that the steps involved in obtaining an accurate error estimate may be implemented by means of a computer program resident on a computer host such as SPARC station or other commercially available computer systems. A flow chart depicting this method is illustrated in FIG. 8.

Figure 5:
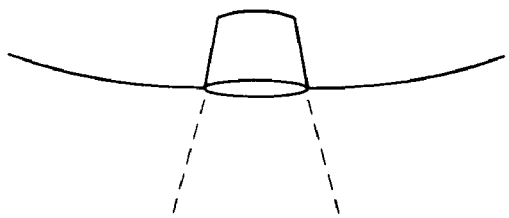
FIG. 5 illustrates the physical model for measuring cirrus cloud temperature and ice-particle size using radiance measurements according to the present invention.
Figure 5:
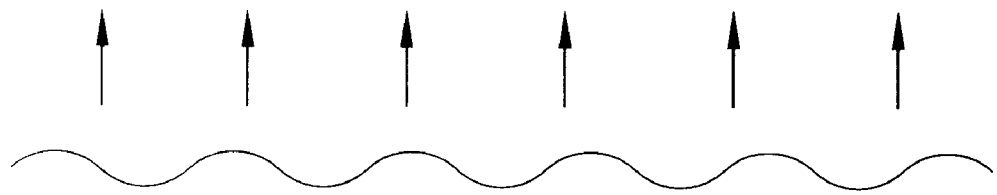
Figure 5:
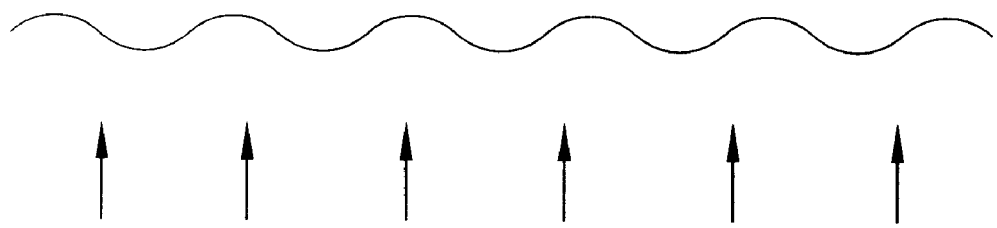

As is well known, the phenomenological relation between cirrus cloud temperature and ice-particle size is $$L(T_c) = \sum_{i=0}^{3} c_i (T_c - 273 \deg K)^i \tag{3.1a}$$

where
L = average ice-particle size (in $\mu$m)
$T_c$ = cirrus = cloud temperature (in deg K)
$c_0 = 326.3$ $\mu$m
$c_1 = 12.42$ $\mu$m/deg K
$c_2 = 0.197$ $\mu$m/(deg K)$^2$
$c_3 = 0.0012$ $\mu$m/(deg K)$^3$ Equation (3.1a) determines the ice-particle size once the cirrus clouds temperature is known. The forward model for the cirrus cloud temperature $T_c$ is $$I_3(v) = (1 - \epsilon_3(v)) \cdot I_{G3}(v) + \epsilon_3(V) \cdot B(v, T_c) \tag{3.2a}$$

for v a wavenumber (in cm$^{-1}$) in the 3.7 $\mu$m region of the earthshine radiance spectrum, $I_3$ the radiance (in watt/sm$^2$/sr/cm)$^1$ in the 3.7 $\mu$m region leaving the cloud, $IG_{G3}$ the radiance (in watt/cm$^2$/sr/cm$^{-1}$) in the 3.7 $\mu$m region coming up from the earth beneath the cloud, $\epsilon_3$, the dimensionless cloud emissivity in the 3.7 μm region, and B the Planck function defined above in equations (2.2a,b). A similar equation can be written for the radiance in the 10–12 μm region of the earthshine spectrum.

$$I_4(v) = (1-\epsilon_4) \cdot I_{G4}(v) + \epsilon_4(v) \cdot B(v, T_c) \quad (3.2b)$$

with $I_4$, $I_{G4}$, and $\epsilon_4$ the same as $I_3$, $I_{G3}$, and $E_3$ except that they apply to the 10–12 μm instead of the 3.7 μm spectral region. FIG. 5 shows that the conceptual basis of equations (3.2a,b) is even simpler than that used for the sea-surface temperature analysis. That is, the present model is a one layer rather than a two-layer transmission-emission model.

Equations (3.2a,b) as written show the two measured quantities $I_3$ and $I_4$ as depending on six unknowns: $I_{G3}$, $I_{G4}$, $\epsilon_3$, $\epsilon_4$, and $T_c$. The values of $I_{G3}$ and $I_{G4}$ however, can be determined from nearby image pixels where there are no cirrus clouds present; and if $\epsilon_3(v)$ and $\epsilon_4(v)$ are replaced by band-averaged constant emissivities $\epsilon_3$ and $\epsilon_4$, there is a known functional relationship between the two emissivities as evidenced in the article by S. C. Ou, K. N. Liou, W. M. Gooch, and Y. Takano, "Remote Sensing of Cirrus Cloud Parameters Using Advanced Very-High-Resolution Radiometer 3.7- and 10–9 μm Channels", *Applied Optics*, Vol. 32, No. 12, 1993, pp. 2171–2180, incorporated herein by reference.

$$(1-\epsilon_3) = (1-\epsilon_4)^{m(T_c)} \quad (3.3a)$$

where $$m(T_c) = \left[ a_0 + \frac{a_1}{L(T_c)} + \frac{a_2}{[L(T_c)]^2} \right]^{-1} \quad (3.3b)$$

for $$a_0 = 0.722, \quad (3.3c)$$
$$a_1 = 55.08\,\mu m,$$
and
$$a_2 = -174.12\,\mu m^2.$$

Function $L(T_c)$ in equation (3.3b) is derived equation (3.1a) above. Now the forward model in equation (3.2a,b) can be approximated by $$I_3(v) = (1-\epsilon_4)^{m(T_c)} \cdot I_{G3}(V) + [1-(1-\epsilon_4)^{m(T_c)}] \cdot B(v, T_c) \quad (3.4a)$$

$$I_4(v) = (1-\epsilon_4) \cdot I_{G4}(v) + \epsilon_4 \cdot B(v, T_c) \quad (3.4b)$$

Such approximations are validated within the following articles incorporated herein by reference. Robert P. d'Entremont, Michael K. Griffin, and James T. Bunting, "Retrieval of Cirrus Radiative Properties and Altitudes Using Multichannel Infrared Data", *Fifth Conference on Satellite Meteorology and Oceanography*, Boston, Mass., American Meteorology Society, Sept. 3–7, 1990, is pp. 4–9; Robert P. D'ENTREMONT, Donald P. Wylie, J. William Snow, Michael K. Griffin, and James T. Bunting, "Retrieval of Cirrus Radiative and Spatial Properties Using Independent Satellite Data Analysis Techniques:, *Proceedings Sixth Conference on Satellite Meteorology and Oceanography*, Atlanta, Ga., American Meteorology Society, Jan. 5–10, pp. 17–20; Robert P. d'Entremont, Donald P. Wylie, Daniel C. Peduzzi, and Joseph Doherty, "Retrieval of Cirrus Radiative and Spatial Properties Using Coincident AVHRR and HIRS Satellite Data", *Passive Infrared Remote Sensing of Clouds and the Atmosphere*. SPIE-The International Society for Optical Engineering, Vol, 1934, 1993, pp. 180–196; S. C. Ou, K. N. Liou, W. M. Gooch, and Y. Takano, "Remote Sensing of Cirrus Cloud Parameters Using Advanced Very-High-Resolution Radiometer 3.7- and 10.9-μm Channels", *Applied Optics*, Vol. 32, No. 12, 1993, pp. 2171–2180; Robert P. d'Entremont and Gary B. Bustafson, "Support of Environmental Requirements for Cloud Analysis and Archive: Detection and Analysis of Cirrus Clouds Using Passive Infrared Satellite Data", Memo from Remote Sensing Group, Atmospheric and Environmental Research, Inc., 840 Memorial Drive, Cambridge, Mass., March 1996; and Algorithm Summaries, Robert d'Entremont, Jan. 22, 1997, VIIRS-40.4.6, pp. 35–37.

When equations (3.4a,b) are integrated over two bands, one in the 3.7 mm region and one in the 10–12 μm region, the four measured values of $\int I_3 dv$, $\int I_4 dv$, $\int I_{G3} dv$, and $\int I_{G4} dv$ give two equations in two unknowns, providing enough information to use the statistical methodology of Section 1. For the 3.7 μm band, which we call band 3, equation (3.4a) is integrated from $v_{3a}$ to $v_{3b}$, and for the 10–μm band, which we call band 4, equation (3.4b) is integrated from $v_{4a}$ to $v_{4b}$.

$$I_3 = f(\varepsilon_4, T_c) \cdot I_{G3} + [1 - f(\varepsilon_4, T_c)] \int_{v_{3a}}^{v_{3b}} B(v, T_c)dv \quad (3.5a)$$

$$I_4 = (1 - \varepsilon_4) \cdot I_{G4} + \varepsilon_4 \int_{v_{4a}}^{v_{4b}} B(v, T_c)dv \quad (3.5b)$$

where (for $I = 3, 4$)

$$I_i = \int_{v_{3a}}^{v_{3b}} I_i(v)dv, \quad (3.5c)$$

$$I_{Gi} = \int_{v_{ia}}^{v_{ib}} I_{Gi}(v)dv, \quad (3.5d)$$

and $$f(\varepsilon_4, T_c) = (1 - \varepsilon_4)^{m(T_c)}. \quad (3.5e)$$

We next define two unknowns $\theta_e$ and $\theta_c$ using $$\epsilon_4 = \epsilon_{04} + \theta_e \quad (3.6a)$$

$$T_c = T_0 + \theta_c \quad (3.6b)$$

where $\epsilon_{04}$ and $T_0$ are typical (or average) values for, respectively, the cloud emissivity in band 4 and the cloud temperature. They are chosen so that the true values of the cloud temperature and emissivity lie reasonably close to $T_0$ and $\epsilon_{04}$, making $\theta_c$ and $\theta_e$ small quantities.

The integrals of $B(v,T_c)$ between $v_{ia}$ and $v_{ib}$ (for I=3,4) are then linearized with respect to $\theta_c$.

$$\int_{v_{ia}}^{v_{ib}} B(v, T_c)dv \cong b_i + \beta_i \theta_c \quad (3.7a)$$

where $$b_i = \int_{v_{ia}}^{v_{ib}} B(v, T_0)dv = C_1 \int_{v_{ia}}^{v_{ib}} \frac{v^3 dv}{e^{C_2 v T_0^{-1}} - 1} \quad (3.7b)$$

and $$\beta_i = \left( \int_{v_{ia}}^{v_{ib}} \frac{\partial B}{\partial T} \bigg|_{T=T_0} \right) dv = \frac{C_1 C_2}{T_0^2} \int_{v_{ia}}^{v_{ib}} \frac{v^4 e^{C_2 v T_0^{-1}} dv}{\left(e^{C_2 v T_0^{-1}} - 1\right)^2} \quad (3.7c)$$

Equations (3.7a) come from a Taylor series expansion of $B(v,T_c)$ about $T_c = T_0$, and equations (2.2a,b) are used to write the integrals in equations (3.7b,c). The next expression which has to be linearized is $f(\epsilon_4, T_c)$. We calculate $$f_{00} = f(\epsilon_{04}, T_0) \quad (3.8a)$$

$$f_{\epsilon 0} = \left(\frac{\partial f}{\partial \varepsilon_4}\right)\bigg|_{\substack{\varepsilon_4 = \varepsilon_{04} \\ T_c = T_0}} = -m(T_0) \cdot (1 - \varepsilon_{04})^{m(T_0)-1} \quad (3.8b)$$

$$f_{TO} = \left(\left(\frac{\partial f}{\partial \varepsilon_4}\right)\bigg|_{\substack{\varepsilon_4 = \varepsilon_{04} \\ T_c = T_0}} = (1 - \varepsilon_{04})^{m(T_0)} \ln(1 - \varepsilon_{04}) \cdot \frac{dm}{dT}\right)\bigg|_{T_c = T_0} \quad (3.8c)$$

where $$\left(\frac{dm}{dT}\right)\bigg|_{T_c=T_0} = \left(\left(\frac{dm}{dL}\frac{dL}{dT_c}\right)\right)\bigg|_{T_c=T_0} = \quad (3.8d)$$

$$[m(T_0)]^2 \cdot \sum_{j=1}^{2} \frac{jb_j}{[L(T_0)]^{j+1}} \cdot \sum_{k=1}^{3} kc_k (T_0 - 273 \deg K)^{k-1}$$

with function $L(T_c)$ defined in equation (3.1a) above. Now $f(\epsilon_4, T_c)$ can be approximated as $$f(\epsilon_4, T_c) \cong f_{00} + f_{\epsilon 0} \theta_e + f_{TO} \theta_c \quad (3.8e)$$

using $\theta_c$ and $\theta_e$ as defined in equations (3.6a,b).

The last step in the linearization process requires the definition of two more variables $\theta_{G3}$ and $\theta_{G4}$.

$$I_{G3} = I_{0G3} + \theta_{G3} \quad (3.9a)$$

$$I_{G4} = I_{0G4} + \theta_{G4} \quad (3.9b)$$

In effect, the determination of $I_{G3}$ and $I_{G4}$ from nearby cloudless pixels is treated as two more measurements. The values of $I_{0G3}$ and $I_{0G4}$ are chosen to make $\theta_{G3}$ and $\theta_{G4}$ small, so they must be typical (or average) values of the $I_{G3}$, $I_{G4}$ radiances.

Equations (3.5a,b) and (3.9a,b) are combined to obtain the complete set of forward equations using (3.6b), (3.7a), and (3.8e) to represent $\epsilon_4$, f, and the integrals over B.

$$I_3 = (f_{00} f_{\epsilon 0} \theta_e + f_{TO} \theta_e)(I_{0G3} + \theta_{G3}) + [1 - f_{00} - f_{\epsilon 0} \theta_e - f_{TO} \theta_c] \\ (b_3 + \beta_3 \theta_c) \quad (3.10a)$$

$$I_4 = (1 - \epsilon_{04} - \theta_e)(I_{0G4} + \theta_{G4}) + (\epsilon_{04} + \theta_e)(b_4 + \beta_4 \theta_c) \quad (3.10b)$$

$$I_{G3} = I_{0G3} + \theta_{G3} \quad (3.10c)$$

$$I_{G4} = I_{0G4} + \theta_{G4} \quad (3.10d)$$

Equations (3.10a–d) are linearized by keeping terms of $0(\theta_c)$, $0(\theta_e)$, $0(\theta_{G3})$, $0(\theta_{G4})$; terms of $0(\theta_e \theta_c)$, $0(\theta_e, \theta_{G3})$, $0(\theta_e \theta_{G4})$, $0(\theta_c \theta_{G3})$, $0(\theta_c \theta_{G4})$, $0(\theta_{G3} \theta_{G4})$ are neglected, as are terms of $0(\theta_c{}^n)$, $0(\theta_e{}^n)$, $0(\theta_{G3}{}^n)$, $0(\theta_{G4}{}^n)$ for n>1. The method followed in the linearization process is that terms which are constant or linear in the θ's are kept, and terms which depend on higher powers of the θ's are dropped.

$$I_3 = \theta_c[\epsilon(I_{0G3} - b_3) + \beta_3(1 - f_{00})] + \theta_e[f_{\epsilon 0}(I_{0G3} - b_3)] + \theta_{G3}[f_{00}] + [f_{00} \\ (I_{0G3} - b_3) + b_3] \quad (3.11a)$$

$$I_4 = \theta_c[\beta_4 \epsilon_{04}] + \theta_e[b_4 - I_{0G4}] + \theta_{G4}[1 - \epsilon_{04}] + [I_{0G4}(1 - \epsilon_{04}) + b_4 \epsilon_{04}] \quad (3.11b)$$

$$I_{G3} = I_{0G3} \theta_{G3} \quad (3.11c)$$

$$I_{G4} = I_{0G4} \theta_{G4} \quad (3.11d)$$

Equations (3.11a–d) can be written in matrix form as $$\bar{I} = \tilde{H} \bar{\theta} + \bar{s} \quad (3.12a)$$

$$\text{where } \bar{I} = \begin{pmatrix} I_3 \\ I_4 \\ I_{G3} \\ I_{G4} \end{pmatrix}, \quad (3.12b)$$

$$\bar{s} = \begin{pmatrix} f_{00} \cdot (I_{0G3} - b_3) + b_3 \\ I_{0G4} \cdot (1 - \varepsilon_{04}) + b_4 \varepsilon_{04} \\ I_{0G3} \\ I_{0G4} \end{pmatrix}, \quad (3.12c)$$

$$\bar{\theta} = \begin{pmatrix} \theta_c \\ \theta_e \\ \theta_{G3} \\ \theta_{G4} \end{pmatrix} \text{ and} \quad (3.12d)$$

$$\tilde{H} = \begin{bmatrix} f_{TO}(I_{0G3} - b_3) + \beta_3(1 - f_{00}) & f_{\epsilon 0}(I_{0G3} - b_3) & f_{00} & 0 \\ \beta_4 \varepsilon_{04} & b_4 - I_{0G4} & 0 & 1 - \varepsilon_{04} \\ 0 & 0 & 1 & 0 \\ 0 & 0 & 0 & 1 \end{bmatrix}. \quad (3.12e)$$

To check the accuracy of equations (3.12a–e) we represent bands 3 and 4 by the VIIRS point design for the 3.7 μm band and one of the 10–12 μm bands, as shown in Table 5. A noise vector $\bar{w} = (w_1, W_2, W_3, W_4)^T$ of zero-mean gaussian random numbers is added to the right-hand side of (3.12a).

$$\bar{I} = \tilde{H} \bar{\theta} + \bar{s} + \bar{w} \quad (3.13a)$$

The noise amplitudes in bands 3 and 4 are $\sigma_3$ and $\sigma_4$ respectively (see Table 5 FIG. 13), so the covariance matrix for the $\bar{w}$ vector is $$\tilde{C} = \begin{bmatrix} \sigma_3^2 & 0 & 0 & 0 \\ 0 & \sigma_4^2 & 0 & 0 \\ 0 & 0 & \sigma_3^2 & 0 \\ 0 & 0 & 0 & \sigma_4^2 \end{bmatrix} \quad (3.13b)$$

Equation (3.13b) assumes the $I_3$, $I_{G3}$ measurements have the same $\sigma_3$ noise amplitude; it assumes that the $I_4$, $I_{G4}$ measurements have the same σ4 noise amplitude; and it assumes the errors in all four measurements $I_3$, $I_4$, $I_{G3}$, $I_{G4}$ are uncorrelated. Equation (3.13a) has the form given in equation (1.8) above, so equation (1.9a) can be used to calculate $C=(H^T C^{-1} H)^{-1}$ to get the expected error in our estimate of $\theta_c$, the cirrus cloud temperature. As will be shown below, and algorithm (see section 7 may be implemented which uses (1.9a) with the constants and matrices specified in Table 5 and equations (3.12e), (3.13b) to calculate $\Delta T_c$=0.836 deg K when $T_0$=230 deg K, $\epsilon_{04}$=0.4, and the values of $I_{0G3}$, $I_{0G4}$ are the band 3 and 4 radiances of a black body at 290 deg K. The corresponding error in the ice-particle size of the cirrus cloud is given by $$\Delta L \cong \frac{dL}{dT_c} \cdot \Delta T_c$$

Table 6 (FIG. 14) is derived from the last page of Section 7 and shows that for a range of $T_c$ values running between 220 deg K and 240 deg K the ice-particle size L runs between 41 $\mu$m and 88 $\mu$m, the absolute error in L is between 1.4 $\mu$m and 2.8 $\mu$m, and the relative error is between 2.9% and 3.3%. These values are a reasonable match to the threshold requirements of the ice-particle size EDR (5% relative error and 2 $\mu$m absolute error for ice particles between 0 and 50 $\mu$m in size, see reference 15). Again, as in Section 2, the calculations have produced believable results.

This statistical methodology can also be used to examine the effect of modeling error. If the forward model for predicting the values of $I_3$ and $I_4$ in equations (3.10a,b) does not predict exactly the $I_3$, $I_4$ atmospheric radiances, this can be regarded as another source of random error and include the amount by which the model is incorrect in the noise vector $\overline{w}$. The modeling error can be treated as measurement "noise" because what is desired of the instruments to measure is the $I_3$, $I_4$ values predicted by the inaccurate model of (3.10a,b). Instead, what is obtained is the radiance coming from the unknown but accurate model, i.e. physical reality. There is no way of knowing whether the modeling error in any given measurement acts to compensate for the measurement noise, or to make the discrepancy worse, so $\sigma_{mod\,3}$ and $\sigma_{mod\,4}$ is taken as the modeling error in bands 3 and 4 respectively, to be independent sources of error obeying a zero-mean gaussian distribution. The covariance matrix C is now written as $$\tilde{C} = \begin{bmatrix} \sigma_3^2 + \sigma_{mod3}^2 & 0 & 0 & 0 \\ 0 & \sigma_4^2 + \sigma_{mod4}^2 & 0 & 0 \\ 0 & 0 & \sigma_3^2 & 0 \\ 0 & 0 & 0 & \sigma_4^2 \end{bmatrix} \quad (3.14)$$

The $I_{G3}$, $I_{G4}$ errors have not been changed because these are the radiances reaching the bottom of the cirrus cloud layer and are measured directly from nearby cloudless pixels. They cannot be affected by modeling error. They might, however, have somewhat different values in the nearby pixels from what they in fact are in the cirrus cloud pixels. We can, therefore, specify that $\sigma_{G3}$ and $\sigma_{G4}$ are the errors in $I_{G3}$, $I_{G4}$ respectively coming from the use of nearby cloudless pixels to estimate the values of $I_{G3}$, $I_{G4}$ in the cirrus cloud pixels. Including them in the formula for the covariance matrix C gives $$\tilde{C} = \begin{bmatrix} \sigma_3^2 + \sigma_{mod3}^2 & 0 & 0 & 0 \\ 0 & \sigma_4^2 + \sigma_{mod4}^2 & 0 & 0 \\ 0 & 0 & \sigma_3^2 + \sigma_{G3}^2 & 0 \\ 0 & 0 & 0 & \sigma_4^2 + \sigma_{G4}^2 \end{bmatrix} \quad (3.15)$$

Estimating reasonable values for a $\sigma_{mod\,3}$, $\sigma_{mod\,4}$, $\sigma_{G3}$, $\sigma_{G4}$ and then using (3.15) to specify matrix C in equation (1.9a) gives us a quick and easy way of including the modeling and procedure errors in the error budget for the ice-particle and cirrus temperature EDR's. Many of the other VIIRS-based EDR's can have their modeling and procedure errors including in their C matrices in a similar way.

Note also how easy it is to find a performance improvement of an EDR algorithm caused by the addition of an extra measurement to the forward model. Suppose the suggestion is made to add a 6.7 $\mu$m measurement, which shall be called band 5, to the cirrus EDR algorithm. Note that the relationship between $\epsilon_5$, the cirrus emissivity in band 5, and $\epsilon_4$, the cirrus emissivity in band 4 is given.

$$(1-\epsilon_5) = (1-\epsilon_4)^{n(T_c)} \quad (3.16)$$

where $n(T_c)$ is a specified function of the cloud temperature $T_c$. We define, following the procedure used on $f(\epsilon_4, T_c)$, that (see equations (3.8a–e))

$$g(\epsilon_4, T_c) = (1-\epsilon_4)^{m(T_c)} \quad (3.17a)$$

$$g_{00} = g(\epsilon_{04}, T_0) \quad (3.17b)$$

$$g_{\epsilon 0} = \left. \frac{\partial g}{\partial \epsilon_4} \right|_{\substack{\epsilon_4 = \epsilon_{04} \\ T_\epsilon = T_4}} \quad (3.17c)$$

$$g_{T0} = \left. \frac{\partial g}{\partial T_c} \right|_{\substack{\epsilon_4 = \epsilon_{04} \\ T_c = T_4}} \quad (3.17d)$$

Following the pattern of equation (3.11a), the two equations shown below are combined, equations (3.18a,b), with equations (3.11a–d) to get the new forward model.

$$I_5 = \theta_c[g_{T0}(I_{0G5} - b_5) + \beta_5(1 - g_{00})] + \theta_c[g_{\epsilon 0}(I_{0G5} - b_5)] + \theta_{G5}[g_{00}] + [g_{00}(I_{0G5} - b_5) + b_5] \quad (3.18a)$$

$$I_{G5} = I_{0G5}\theta_{G5} \quad (3.18b)$$

We next define $b_5$, $\beta_5$ in terms of the wavenumber limits $v_{5a}$, $v_{5b}$ of band 5.

$$b_5 = \int_{v_{5a}}^{v_{5b}} B(v, T_0) dv \quad (3.18c)$$

$$\beta_5 = \int_{v_{5a}}^{v_{5b}} \left. \frac{\partial B}{\partial T} \right|_{T=T_4} dv \quad (3.18d)$$

The in-band signals for the band 5 radiances coming from pixels with and without the cirrus clouds are, respectively, $I_5$ and $I_{G5}$. The value of $I_{0G5}$ is chosen to make $\theta_{G5}$ small. Augmenting H, $\theta$, and $\overline{s}$ to include equations (3.18a,b) gives $$\tilde{H} = \begin{bmatrix} f_{T0}(I_{0G3}-b_3)+\beta_3(1-f_{00}) & f_{\varepsilon 0}(I_{0G3}-b_3) & f_{00} & 0 & 0 \\ \beta_4\varepsilon_{04} & b_4-I_{0G4} & 0 & 1-\varepsilon_{04} & 0 \\ g_{T0}(I_{0G5}-b_5)+\beta_5(1-g_{00}) & g_{\varepsilon 0}(I_{0G5}-b_5) & 0 & 0 & g_{00} \\ 0 & 0 & 1 & 0 & 0 \\ 0 & 0 & 0 & 1 & 0 \\ 0 & 0 & 0 & 0 & 1 \end{bmatrix} \quad (3.19a)$$

$$\tilde{\theta} = \begin{pmatrix} \theta_c \\ \theta_\varepsilon \\ \theta_{G3} \\ \theta_{G4} \\ \theta_{G5} \end{pmatrix}, \quad (3.19b)$$

$$\tilde{s} = \begin{pmatrix} f_{00}\cdot(I_{0G3}-b_3)+b_3 \\ I_{0G4}\cdot(1-\varepsilon_{04})+b_4\varepsilon_{04} \\ g_{00}\cdot(I_{0G5}-b_5)+b_5 \\ I_{0G3} \\ I_{0G4} \\ I_{0G5} \end{pmatrix} \quad (3.19c)$$

The matrix C corresponding to equation (3.13b) is $$\tilde{C} = \begin{bmatrix} \sigma_3^2 & 0 & 0 & 0 & 0 & 0 \\ 0 & \sigma_4^2 & 0 & 0 & 0 & 0 \\ 0 & 0 & \sigma_5^2 & 0 & 0 & 0 \\ 0 & 0 & 0 & \sigma_3^2 & 0 & 0 \\ 0 & 0 & 0 & 0 & \sigma_4^2 & 0 \\ 0 & 0 & 0 & 0 & 0 & \sigma_5^2 \end{bmatrix} \quad (3.19d)$$

where $\sigma_5$ is the noise amplitude of the band 5 signal. Modeling and procedure errors can be added to (3.19d) the same way they were added to equation (3.15). Equation (1.9a) can now be used to find $\Delta t_c$, the expected error in the cirrus cloud temperature, and equation (3.13c) then gives $\Delta L$, the expected error in the size of the cirrus ice particles.

Section 4: Computer-Based Forward Models

Some forward models are too complex to be easily written down algebraically. The models connecting atmospheric temperature and water-vapor profiles with the CrIs infrared spectra are one obvious example, and the VIIRS-based ocean-color and aerosol EDR's may be another (see reference 16). Typically, what does exist in these cases is a complex, computer-based forward model going from the EDR inputs to a collection of output radiances. Fortunately, this is all the information needed to find matrix H. We outline below how this is down, defining the variables in terms of the CrIS-based EDR's because the best-known forward models for these EDR's, such as MODTRAN or FASCODE, are entirely computerized.

The computer-based forward model is represented by the vector $$\bar{f} = \begin{pmatrix} f_1 \\ f_2 \\ \vdots \\ f_C \end{pmatrix} \quad (4.1)$$

where C is the total number of radiance outputs of the forward model. For the CrIS-based EDR's, it is the total number of FTIR channels in the measured infrared spectra (C is approximately 1500 for the current point design). The forward model inputs are represented by the vector $$\bar{T} = \begin{pmatrix} T_1 \\ T_2 \\ \vdots \\ T_S \end{pmatrix} \quad (4.2)$$

where S is the total number of these inputs. For the CrIS-based EDR's it is about twice the total number of atmospheric layers because each layer is characterized by both a temperature and a water-vapor concentration (S is typically about 70 for this type of forward model). An exact representation of the forward model can be written as $$\bar{f}=f(\bar{T}) \quad (4.3a)$$

or $$f_i=f_i(\bar{T})=f_i(T_1, T_2, \ldots, T_S) \quad (4.3b)$$

for I=1,2, . . . ,C.

The linearized forward equations are $$f_i \cong f_i(\bar{T}_0) + \sum_{j=1}^{S} \left.\frac{\partial f_i}{\partial T_j}\right|_{\bar{T}=\bar{T}_0} \cdot (T_j - T_{0j}) \quad (4.4a)$$

where $\bar{T}_0$ is the collection of input values for some standard atmosphere which is a good approximation for the true temperature and water-vapor profiles.

$$\bar{T}_0 = \begin{pmatrix} T_{01} \\ T_{02} \\ \vdots \\ T_{0S} \end{pmatrix} \quad (4.4b)$$

We calculate $\bar{f}_0$, the vector of forward model outputs for the standard atmosphere $\bar{T}_0$.

$$\bar{f}_0=f(\bar{T}_0) \quad (4.5a)$$

or $$\bar{f}_0 = \begin{pmatrix} f_{01} \\ f_{02} \\ \vdots \\ f_{0C} \end{pmatrix} = \begin{pmatrix} f_1(\bar{T}_0) \\ f_2(\bar{T}_0) \\ \vdots \\ f_C(\bar{T}_0) \end{pmatrix} = \begin{pmatrix} f_1(T_{01}, T_{02}, \ldots, T_{0S}) \\ f_2(T_{01}, T_{02}, \ldots, T_{0S}) \\ \vdots \\ f_2(T_{01}, T_{02}, \ldots, T_{0S}) \end{pmatrix} \quad (4.5b)$$

We define a new vector $\delta\bar{T}^{[k]}$ to be an S-dimensional column vector which is zero everywhere except for the d'th component which is $\delta T_k$.

$$\delta T^{[k]} = \begin{pmatrix} 0 \\ 0 \\ \vdots \\ \delta T_k \\ \vdots \\ 0 \end{pmatrix} \begin{matrix} \text{1'st component} \\ \text{2'nd component} \\ \vdots \\ k\text{'th component} \\ \vdots \\ S\text{'th component} \end{matrix} \quad (4.6)$$

We run the forward model for $\bar{T}_0 + \delta\bar{T}^{[k]}$, giving us a vector of outputs which we call $\bar{f}^{[k]}$.

$$\bar{f}^{[k]} = f(\bar{T}_0 + \delta\bar{T}^{[k]}) \quad (4.7a)$$

or $$\bar{f}^{[k]} = \begin{pmatrix} (\bar{f}^{[k]})_1 \\ (\bar{f}^{[k]})_2 \\ \vdots \\ (\bar{f}^{[k]})_C \end{pmatrix} = \quad (4.7b)$$

$$\begin{pmatrix} f_1(\bar{T}_0 + \delta\bar{T}^{[k]}) \\ f_2(\bar{T}_0 + \delta\bar{T}^{[k]}) \\ \vdots \\ f_C(\bar{T}_0 + \delta\bar{T}^{[k]}) \end{pmatrix} = \begin{pmatrix} f_1(T_{01}, T_{02}, \ldots, T_{0k}+\delta T_k, \ldots, T_{0S}) \\ f_2(T_{01}, T_{02}, \ldots, T_{0k}+\delta T_k, \ldots, T_{0S}) \\ \vdots \\ f_C(T_{01}, T_{02}, \ldots, T_{0k}+\delta T_k, \ldots, T_{0S}) \end{pmatrix}$$

Vector $\bar{f}_0$ represents the output of the computer-based forward model for the standard atmosphere inputs $\bar{T}_0$, and $\bar{f}^{[k]}$ is the output of the forward model with all the standard atmosphere inputs left unchanged except for the k'th input, which has been changed by an amount $\delta T_k$. To create a complete collection of $\bar{f}^{[k]}$ vectors the forward model must be run S times.

Returning to equation (4.4a) above, we recognize that it can be written as $$\bar{f} = \bar{H}\bar{\theta} + \bar{f}_0 \quad (4.8a)$$

where $$\bar{\theta} = \bar{T} - \bar{T}_0, \quad (4.8b)$$

and $H_{ij}$, the ij'th component of matrix H, is given by $$H_{ij} = \left.\frac{\partial f}{\partial T_j}\right|_{T=T_0} \quad (4.8c)$$

Equations (4.8a–c) represent a restatement of equations (1.3b–d) in Section 1 above. The forward model predictions $\bar{f}$ in equation (1.8a) have no errors; but the actual CrIS spectra, of course, will. The measurement errors are represented in the usual way as an additive random vector $\bar{w}$ on the right-hand side of equation (4.8a), giving us $$\bar{f}_{measured} = \bar{H}\bar{\theta} + \bar{s} + \bar{w} \quad (4.8d)$$

where $\bar{s} = \bar{f}_0$. The random vector $\bar{w}$ is characterized by a covariance matrix C coming from the point design of the CrIS. Equation (4.8d) is the same as equation (1.8), so as soon as matrix H is known, equation (1.9a) can be used to calculate the expected errors in the retrieved values of $\bar{T}_0 + \bar{\theta}$. From (4.8b) we see that $$H_{ij} = \left.\frac{\partial f_i}{\partial T_j}\right|_{T=T_0} \cong \frac{(\bar{f}^{[k]} - \bar{f}_0)_i}{\delta T_j} \quad (4.9)$$

where $(\bar{f}^{[k]} - \bar{f}_0)_i$ is the i'th component of the vector difference $(\bar{f}^{[k]} - \bar{f}_0)$. Equation (4.9) shows that the k'th column of H can be calculated by subtracting $\bar{f}_0$, the standard atmosphere outputs of the forward model, from $\bar{f}[k]$, the forward-model outputs when only the k'th input of the standard atmosphere has been changed by $\delta T_k$. This procedure requires the forward model to be run S+q times, once to calculate $\bar{f}_0$ and S times to calculate $\bar{f}^{[k]}$ for $k=1,2,\ldots,S$.

For the CrIS-based EDR's, such as the temperature and water-vapor profiles, there usually exists a matrix $C_\theta$ describing the covariance of the expected EDR values between different levels of the atmosphere. Therefore, equation (1.11b) should be used to estimate the errors in these EDR's. In general, a covariance matrix $C_\theta$ describes what is known about the statistics of the desired EDR's before any measurements are made. By making conservative or aggressive assumptions about $C_\theta$, we can determine conservative or aggressive values for the expected errors in these CrIS-based EDR's. When no assumptions are made about the EDR values, the $C_\theta$ matrix can be set to zero and equation (1.9a) used to find the expected errors in the retrieved EDR's. Equation (4.9) can be used to find H for any computer-based forward model; accordingly, the above detailed steps are also applicable to VIIRS-based EDR's.

Section 5

Suppose we have two straight lines written in functional form as $f_1(v)$ and $f_2(v)$ where $$f_1(v) = m_1 v + b_1,$$

$$f_2(v) = m_2 v + b_2,$$

and we want to see whether $$f_1(v) \cong A \cdot f_2(v)$$

for some constant A. One quick way of doing this is to see whether $$\frac{m_1}{b_1} \cong \frac{m_2}{b_2}$$

because $$m_1 v + b_1 = A \cdot (m_2 v + b_2)$$

can only be true (for all values of v) when $m_1 = A m_2$ and $b_1 = A b_2$, or $$\frac{m_1}{b_1} = \frac{m_2}{b_2}$$

Section 6

This algorithm is used to calculate the expected error in the sea surface temperature measured by satellite IR radiometers operating in the 800 to 1000 $cm^{-1}$ atmospheric spectral window and utilizes formulas on pages 97 and 391 of Steven M. Kay's textbook *Fundamentals of Statistical Signal Processing: Estimation Theory*, PTR Prentice Hall, Englewood Cliffs, N.J. 1993, ISBN 0-13-345711-7.

Start by defining constants used in the calculations. Variable n is the power of v (wavenumber) over temperature used to match $(\exp(x)-1)^{\wedge}(-1)$ in the Planck function for wavenumbers between 800 and 100 cm$^{-1}$ and temperatures between 310 and 290 deg K. Variable CB is a constant used to normalize the measured inband radiances when applying the model equations. It has units of watt-cm2/sr/(cm-deg K)^n. The atmospheric transmittance is modeled as 1-K(v)*A where K(v) is a straight line of slope M in units of cm. (This transmittance model assumes that the radiometer measurements are made over a wide enough band that we can neglect the rapid up-and-down variation of the atmospheric transmittance with respect to v.)

N:=4.4
CB:=$1.98 \cdot 10^{-12}$
M:=$8.0 \cdot 10^{-4}$

Define the F4 and F5 functions which will be used to calculate the elements of matrix H as defined on pages 97 and 391 of Steven Kay's text. Variables va and vb are, respectively, the beginning and ending wavenumbers of the spectral band being measured by the satellite radiometer.

$$F_4(va, vb) := \frac{vb^{4-n} - va^{4-n}}{4-n}$$

$$F_5(va, vb) := \frac{vb^{5-n} - va^{5-n}}{5-n}$$

Specify two bands for the radiometer measurement, band 1 between 800 and 870 cm$^{-1}$ and band 2 between 885 and 971 cm$^{-1}$. Variable σ1 is the standard deviation of the measurement error in band 1 in units of watt/cm2/sr, and σ2 is the standard deviation of the measurement error in band 2 in units of watt/sm2/sr. We set up matrices C and H as defined on pages 97 and 391 of Steven Kay's book.

$$\sigma1 := 1.470 \cdot 10^{-6}$$

$$\sigma2 := 1.740 \cdot 10^{-6}$$

$$C := \begin{bmatrix} \frac{\sigma1^2}{CB^2} & 0 \\ 0 & \frac{\sigma2^2}{CB^2} \end{bmatrix}$$

$$C = \begin{pmatrix} 5.5119376 \cdot 10^{11} & 0 \\ 0 & 7.7226814 \cdot 10^{11} \end{pmatrix}$$

$$H := \begin{pmatrix} F_4(800, 870) & F_4(800, 870) - M \cdot F_5(800, 870) \\ F_4(885, 971) & F_4(885, 971) - M \cdot F_5(885, 971) \end{pmatrix}$$

$$H = \begin{pmatrix} 0.0056907 & 0.0018924 \\ 0.0060319 & 0.0015583 \end{pmatrix}$$

Utilize the formula on page 97 of Steven Kay's book to calculate the expected error in the estimate of TS^n, the n'th power of the sea-surface temperature in units of degK^n. Matrix Cu is the covariance matrix for the estimate of Ts^n and the unknown atmospheric transmittance parameter.

$$C_u := (H^T \cdot C^{-1} \cdot H)^{-1}$$

$$C_u = \begin{pmatrix} 6.3261296 \cdot 10^{17} & -2.0805154 \cdot 10^{18} \\ -2.0805154 \cdot 10^{18} & 6.9460426 \cdot 10^{18} \end{pmatrix}$$

The corresponding error in the measured sea-surface temperature is σTs, its standard deviation in degK. It is expected that the sea-surface temperature lies between 290 and 310 degK, so we calculate a table of corresponding σTs values.

$Ts_0 := 290.$ $Ts_1 := 295.$ $Ts_2 := 300.$ $Ts_3 := 305.$ $Ts_4 := 310.$ $i := 0..4$ $$\sigma Ts_i := \frac{(C_{u_{0,0}})^{0.5}}{n \cdot ((Ts)_i)^{n-1}}$$

$$\frac{1}{5} \cdot \sum_{k=0}^{4} \sigma Ts_k = 0.6866098$$

| $Ts_i$ | $\sigma Ts_i$ |
|---|---|
| 290 | 0.7672964 |
| 295 | 0.7239716 |
| 300 | 0.6837606 |
| 305 | 0.6463934 |
| 310 | 0.6116269 |

Section 7

This algorithm is used to estimate the error involved in finding the ice-particle size of cirrus clouds using VIIRS measurements (based on the 1997 NPOES proposal) in the 3.7 micron (band 3) and 10.9 micron (band 4) radiance bands. The analysis presented below is based on information about the dependence of the bands 3 and 4 radiances in a paper "Remote Sensing of Cirrus Cloud Parameters Using Advanced Very-High-Resolution Radiometer 3.7 and 10.9 μm Channels" in *Applied Optics*, Vol. 32, No. 12, April 1993 by S. C. Ou, K. N. Liou, W. M. Gooch, and Y. Takanco, pp. 2171–2180, (see especially eqns. (1a,b) on p. 2172 and eqn. (4) on p. 2173), and incorporated herein by reference. The statistical analysis is based on eqns. (4.30) and (4.32) on page 97 of Fundamentals of Statistical Signal Processing: Estimation Theory by Steven M. Kay, PTR Prentice Hall, Englewood Cliffs, N.J. 1993 (ISBN 0-13-345711-7).

Create a function called PLnck(x) which calculates 1(exp (x)–1). When x is close to zero it replaces exp(x)–1 and returns 1/x exactly.

$$PLnck1(x) := \frac{1.}{e^x - 1.}$$

$$PLnck2(x) := \frac{1.}{x}$$

PLnck(x):=if(|x|>0.01, PLnck(x), PLnck2(x))

Generate C1 and C2 black body constants used to specify Planck's curve. Variable C1 has units of watt/sm2/sr/(cm–1)4 and variable C2 has units of degK/cm–1.

C1:=$1.191062 \cdot 10^{12}$ C2:=$1.438786$

Specify Ibb__Winvcminvsr as a function of wavenumber a (in cm–1) and temperature T (in degK). The units of Ibb__Winvminvsr are Watts/cm/sr.

$$Ibb\_Winvcminvsr(\sigma, T) := C1 \cdot (|\sigma|)^3 \cdot PLnck\left(\frac{C2 \cdot |\sigma|}{T}\right)$$

Specify IdT__WinvcminvsrinvdegK, the derivative of Ibb__ Winvcminvsr, as a function of wavenumber σ (in cm–1) and temperature T (in degK). The units of IdT__ WinvcminvsrinvdegK are W/cm/sr/degK.

$$IdT\_WinvcminvsrinvdegK(\sigma, T) :=$$

$$C1 \cdot C2 \cdot \left(\sigma^2 \cdot \frac{1}{T} \cdot PLnck\left(\frac{C2 \cdot |\sigma|}{T}\right)\right)^2 \cdot e^{\frac{C2 \cdot |\sigma|}{T}}$$

Specify the beginning and ending wavenumbers (in cm−1) of band 3, called v3a and v3b respectively, and the beginning and ending wavenumbers of band 4, called v4a and v4b respectively.

v3a__invcm:=2545
v3b__invcm:=2817
v4a__invcm:=885
v4b__invcm:=971

Variable nedt3__degK is the NEDT (in degK) expected for the band 3 point design of VIIRS in the 1997 NPOES proposal. Variable nedt4__degK is the NEDT (in degk) for the band 4 point design of VIIRS in the 1997 NPOES proposal. Tnedt3__degK and Tnedt4__degK are the band 3 and band 4 scene temperatures at which the NEDT values are evaluated.

Nedt3__degK:=0.2
Tnedt3__degK:=271.0
nedt4__degK:=0.1
Tnedt4__degK:=293.0

Variable σ3__Winvcm2invsr is the expected measurement error (standard deviation of the additive noise) in band 3 in units of Watt/sm2/sr, and σ4__Winvcm2invsr is the expected measurement error (standard deviation) in band 4 in units of Watt/sm2/sr.

$$\sigma 3\_temp := \int_{v3a\_invcm}^{v3b\_invcm} Ibb\_Winvcminvsr(v, Tnedt3\_degK + nedt3\_degK) dv$$

$$\sigma 3\_Winvcm2invsr := \sigma 3\_temp - \int_{v3a\_invcm}^{v3b\_invcm} Ibb\_Winvcminvsr(v, Tnedt3\_degK) dv$$

$$\sigma 3\_Winvcm2invsr = 4.524543 \cdot 10^{-8}$$

$$\sigma 4\_temp := \int_{v4a\_invcm}^{v4b\_invcm} Ibb\_Winvcminvsr(v, Tnedt4\_degK + nedt4\_degK) dv$$

$$\sigma 4\_Winvcm2invsr := \sigma 4\_temp - \int_{v4a\_invcm}^{v4b\_invcm} Ibb\_Winvcminvsr(v, Tnedt4\_degK) dv$$

$$\sigma 4\_Winvcm2invsr = 1.36361 \cdot 10^{-6}$$

Calculate the constants a3__Winvcm2invsr, β3__Winvcm2invsrinvdegK and a4__Winvcm2invsr, β4__Wincm2invsrinvdegK which are used to linearize with respect to temperature the integrals over bands 3 and 4 of the Planck black-body function. The integrals are linearized about temperature T0__degK (in units of degK).

T0__degK:=230.0

$$a3\_Winvcm2invsr := \int_{v3a\_invcm}^{v3b\_invcm} Ibb\_Winvcminvsr(v, T0\_degK) dv$$

$$\beta 3\_Winvcm2invsrinvdegK := \int_{v3a\_invcm}^{v3b\_invcm} IdT\_Winvcminvsrinvdeg K(v, T0\_degK) dv$$

$$a3\_Winvcm2invsr = 3.514805 \cdot 10^{-7} \quad \beta 3\_Winvcm2invsrinvdegK = 2.53364 \cdot 10^{-8}$$

$$a4\_Winvcm2invsr := \int_{v4a\_invcm}^{v4b\_invcm} IdT\_Winvcminvsr(v, T0\_degK) dv$$

$$\beta 4\_Winvcm2invsrinvdegK := \int_{v4a\_invcm}^{v4b\_invcm} IdT\_Winvcminvsrinvdeg K(v, T0\_degK) dv$$

$$a4\_Winvcm2invsr = 2.477482 \cdot 10^{-4} \quad \beta 4\_Winvcm2invsrinvdegK = 6.259776 \cdot 10^{-6}$$

Define function L__μm m, the cirrus cloud ice-particle size (in microns) as a function of cloud temperature Tc (in deg K). The best fit constants c0__μm, c1__μminvdegK, c2__minvdegK2, and c3__minvdegK3 come from curve fitting of cloud data. C0__μm:=326.3 c1__μminvdegK:=12.42 c2__μminvdegK2:=0.197 c3 μminvdegK3:=0.0012 L__μm (tc):=c0μm+c1__μminvdegK·(Tc-273)+c2__μminvdegK2 ·(Tc-273)²+c3__μminvdegK3 (Tc-273)³

Define function m (dimensionless), the exponent used in the forward radiance model for bands 3 and 4. It depends on L__μm, the cirrus cloud ice-particle size in microns. The constants a0s, a2s__μm, and A2s__μm2 define the dependence of m on L__μm. a0s:=0.722 a1s__μm:=55.08 a2s__μm2:=−174.12

$$m(L\_\mu m) := \left(a0s + \frac{a1s\_\mu m}{L\_\mu m} + \frac{a2s\_\mu m2}{L\_\mu m^2}\right)^{-1}$$

Define the derivative of function m with respect to its argument L__μm, mdL__invμm (in units of μm-1)

$$mdL\_inv\mu m(L\_\mu m) := (-1) \cdot \left(-\frac{a1s\_\mu m}{L\_\mu m^2} - 2\frac{a2s\_\mu m2}{L\_\mu m^3}\right) \cdot m(L\_\mu m)^2$$

Define the derivative of L__μm with respect to its argument Tc, LdT__μminvdegK (in units of μm/degK) LdT__μminvdegK(Tc):=c1__μminvdegK+2·c2__μminvdegK2·(Tc-273)+3·c3__μminvdegK3·(Tc-273)²

Define the derivative of m with respect to the cirrus cloud temperature Tc, mdT__invdegK (in degK-1).
MdT__invdegK(Tc):=mdL__invμm(L__μm(Tc))·LdT__μminvdegK(Tc)

Specify ε04, the dimensionless average emissivity of the cirrus clouds. ε04:=0.4

Define the values of the constants f00, f_ε, 0, and fT0__invdegK.
F00:=(1−ε04)^m(T0__degK)
F00=0.586773
fε0:=−m(T0__degK)·(1−ε04)^(m(T0__degK)−1)
fε0=1.020631
fT0__invdegK:=(1−ε04)^m(T0__degK)·In(1−ε044)·mdT__invdegK(T0__degK)
fT0__invdegK=0.003404

Create typical values for the amount of in-band radiance in bands 2 and 3 reaching the cirrus clouds from the ground by estimating the surface temperature as Ts__degK (in degK) and integrating the Planck function at this temperature over bands 3 and 4. Variable IOG3__Winvcm2invsr and IOG4__Winvcm2invsr are these in-band radiances for bands 3 and 4 respectively (in units of watts/cm2/sr).

$Ts\_degK := 290.0$ $IOG3\_Winvcm2invsr := \int_{v3a\_invcm}^{v3b\_invcm} Ibb\_Winvcminvsr(v, Ts\_degK) dv$ $IOG3\_Winvcm2invsr = 1.090699 \cdot 10^{-5}$ $IOG4\_Winvcm2invsr := \int_{v4a\_invcm}^{v4b\_invcm} Ibb\_Winvcminvsr(v, Ts\_degK) dv$ $IOG4\_Winvcm2invsr = 8.277405 \cdot 10^{-4}$ Define the H matrix used on page 97 of Steven Kay's text (referenced at start of this spreadsheet).

H11:=fT0__invdegK-(I0G3__Winvcm2invsr-a3__Winvcm2invsr)+β3__Winvcm2invsrinvdegK·(1-f00)
H12:=fε0·(I0G3__Winvcm2invsr-a3__Winvcm2invsr)
H13:=f00
H21:=β4__Winvcm2invsrinvdegK·ε04
H22:=a4__Winvcm2invsr-I0G4__Winvcm2invsr
H24:=1-ε04

$\left|\begin{pmatrix} H11 & H12 \\ H21 & H22 \end{pmatrix}\right| = 4.174389 \cdot 10^{-11}$ $H := \begin{bmatrix} H11 & H12 & H13 & 0 \\ H21 & H22 & 0 & H24 \\ 0 & 0 & 1 & 0 \\ 0 & 0 & 0 & 1 \end{bmatrix}$ $|H| = 4.174389 \cdot 10^{-11}$ $H = \begin{bmatrix} -2.546336 \cdot 10^{-8} & -1.077328 \cdot 10^{-5} & 0.586773 & 0 \\ 2.50391 \cdot 10^{-6} & -5.799924 \cdot 10^{-4} & 0 & 0.6 \\ 0 & 0 & 1 & 0 \\ 0 & 0 & 0 & 1 \end{bmatrix}$ Specify the noise covariance matrix C specified in page 97 of Steven Kay's text (referenced at the beginning of the spreadsheet)

$C := \begin{bmatrix} \sigma3\_Winvcm2invsr^2 & 0 & 0 & 0 \\ 0 & \sigma4\_Winvcm2invsr^2 & 0 & 0 \\ 0 & 0 & \sigma3\_Winvcm2invsr^2 & 0 \\ 0 & 0 & 0 & \sigma4\_Winvcm2invsr^2 \end{bmatrix}$ Calculate the covariance matrix of the errors in the determination of unknown parameters: the cirrus cloud temperatures, the emissivity of the cirrus in band 4, the deviation of the radiance reaching the cloud from the ground from its nominal values in band 3, and the same radiance deviation in band 4. Here we are only interest in the error in the estimate of the cirrus cloud temperature, whose variance will be given by the "1,1" value of the error covariance matrix Cθ.

$$C\theta := (H^T \cdot C^{-1} \cdot H)^{-1}$$

$$C\theta = \begin{bmatrix} 0.699692 & 0.001895 & 1.668972 \cdot 10^{-8} & -2.879297 \cdot 10^{-7} \\ 0.001895 & 1.084238 \cdot 10^{-5} & 7.205191 \cdot 10^{-11} & 6.805411 \cdot 10^{-10} \\ 1.668972 \cdot 10^{-8} & 7.205191 \cdot 10^{-11} & 2.047149 \cdot 10^{-15} & 0 \\ -2.879297 \cdot 10^{-7} & 6.805411 \cdot 10^{-10} & 0 & 1.859431 \cdot 10^{-12} \end{bmatrix}$$

The standard deviation of the error in the cirrus temperature (in degK) is $\sigma Tc\_degK$.

$$\sigma Tc\_degK := \sqrt{C\theta_{0,0}} \qquad \sigma Tc\_degK = 0.836476$$

Use the previously-defined function $L\_\mu m$, which depends on the cirrus cloud temperature in degK, to create a table of the error in $L\_\mu m$ expected given the above error $\sigma Tc\_degK$ in the estimated cloud temperatures.

$$i := 0,..21 \quad Tc_i := 220 + (i-1) \cdot 1 \quad Lmicron_i := L\_\mu m(Tc_i)$$
$$Lmicron\_err_i := LdT\_\mu minvdegK(Tcp_i) \cdot \sigma Tc\_degK$$

$$Rel\_errL_i := \frac{Lmicron\_err_i}{Lmicron_i}$$

| $Lmicron_i$ | $Lmicron\_err_i$ | $Rel\_errL_i$ |
|---|---|---|
| 41.1152 | 1.373158 | 0.033398 |
| 42.7606 | 1.380519 | 0.032285 |
| 44.4184 | 1.393903 | 0.031381 |
| 46.0958 | 1.413309 | 0.03066 |
| 47.8 | 1.438738 | 0.030099 |
| 49.5382 | 1.47019 | 0.029678 |
| 51.3176 | 1.507664 | 0.029379 |
| 53.1454 | 1.55116 | 0.029187 |
| 55.0288 | 1.60068 | 0.029088 |
| 56.975 | 1.656222 | 0.029069 |
| 58.9912 | 1.717786 | 0.029119 |
| 61.0846 | 1.785374 | 0.029228 |
| 63.2624 | 1.858984 | 0.029385 |
| 65.5318 | 1.938616 | 0.029583 |
| 67.9 | 2.024271 | 0.029813 |
| 70.3742 | 2.115949 | 0.030067 |
| 72.9616 | 2.213649 | 0.03034 |
| 75.6694 | 2.317372 | 0.030625 |
| 78.5048 | 2.427118 | 0.030917 |
| 81.475 | 2.542886 | 0.031211 |
| 84.5872 | 2.664677 | 0.031502 |
| 87.8486 | 2.79249 | 0.031788 |

Conclusion

The statistical methodology outlined in Section 1, and applied to an algebraic forward model for the sea-surface temperature in Section 2 and an algebraic forward model for the size of cirrus ice particles in Section 3 provides a measure of the accuracy in which a satellite may yield parameters of the earth's surface. In Section 2 the predicted EDR performance matched NOAA's past experience for two-band sea-surface temperature retrieval, and in Section 3 the predicted performance matched NOAA's threshold requirements. Thus, in both cases, the statistical methodology led to reasonable results. The performance of an augmented EDR algorithm can also be determined when an extra band is used to provide more spectral information, as well as how the effect of modeling error could be easily included in the covariance matrix describing the measurement uncertainties. Section 4 showed how to obtain the matrix elements of the linearized forward model (which the statistical methodology requires) when the forward model is only available as a computer program. The forward model for the CrIS-based EDR's, as well as some of the more complicated VIIRS-based EDR's, may in fact, only exist in computerized form.

Current techniques for deriving VIIRS-based EDR's seem to rely on creating forward models consisting of N equations in N unknowns and then solving for one or more of the unknowns to create the desired algorithm. Clearly, such a procedure cannot be applied to forward models consisting of N equations in M unknowns when N>M; yet the information provided by the extra equations might well lead to more accurate EDR algorithms. This sort of situation, where the forward model has more equations than unknowns, is exactly the sort of situation which is easily handled by the statistical methodology according to the present invention. The current VIIRS-based EDR algorithms also have no way of using correlations between the M unknowns of the forward mode, and this is additional extra information which can be easily handled by this methodology. While EDR algorithms based on the methodology will have come from linearized forward models and so may be less accurate than EDR algorithms based on the full non-linear forward models, their ability to use extra information may provide a performance advantage over their non-linear counterparts, especially when the desired EDR's exhibit only moderate variations about a climatic mean. For these reasons, algorithms derived from equations (1.9b) and (1.11 c,d) in Section 1 may well provide a significant advance over the current state of the art in VIIRS-based EDR retrieval.

Moreover, the statistical method according to the present invention provides a quick and easy means of estimating the expected performance of an EDR algorithm. Current methods for determining performance envisions a series of Monte-Carlo, end-to-end simulations based on combinations of EDR forward models with the simulated sensors and the proposed EDR algorithms. The inputs of the forward models would be changed randomly and compared again and again to the outputs coming from the EDR algorithms. This is a truly ambitious program of number crunching and may, in the end, provide only imprecise knowledge of the EDR algorithms' performance, especially if only a relatively few Monte-Carlo runs are performed. Although some type of end-to-end Monte-Carlo simulation will be required to verify performance predictions achieved by other means (such as the statistical methodology discussed in Sections 1–4 above), this sort of simulation is at best a clumsy way of examining different algorithms for the same EDR. As we have shown in Sections 1–4, the present statistical methodology only needs an EDR's linearized forward model to predict the EDR algorithm's behavior; compared to an end-to-end simulation it well more quickly and easily suggest which version of an EDR algorithm has the best performance. When it becomes time to perform an end-to-end simulation, this methodology will, by having already examined the algorithm's behavior, provide an approximate answer to the simulation's results, helping to avoid gross errors in the computer calculations.

What is claimed is:

1. A method of estimating expected errors of environmental data parameters based on radiance measurements obtained from visible infra red radiometric satellite sensors (VIIRS) orbiting the earth, comprising the steps of:

obtaining N radiance measurements of a surface body $I_1, \ldots I_N$ defining a matrix I depending on p unknown surface and atmospheric parameters $T_i, \ldots T_p$, defining a matrix T;

generating a forward model I=f(T) for obtaining said I radiance measurements from said p parameters, where f(T) comprises an N element matrix;

choosing an initial set of values for said p parameters and linearizing f(T) about said initial values to obtain a linearized forward model $I=s+H\theta$ as $f_i(T_{01}, T_{02}, \ldots T_{0p})+\Sigma H_{ij}\ \theta_j$ where $I=1,2, \ldots N$ and $\theta_j=T_j-T_{oj}$ and $H_{ij}=\delta_i f/\delta T_j$ and where $\theta$ is a column matrix $_1\theta, \ldots _p\theta$ and H is a matrix of $H_{ij}$ values;

adding measurement noise vector w of noise values to said forward model;

determining the covariance of said measurement noise w to obtain a covariance matrix C; and manipulating the matrices H and C according to the equation $C_{EDR=(H}{}^T C^{-1}H)^{-1}$ to obtain a matrix element of $C_{EDR}$ indicative of the expected errors in said values of $T_1, \ldots T_p$ parameters.

2. The method according to claim 1, wherein said measurement noise w comprises N random numbers $w_1, \ldots, w_N$.

3. The method according to claim 2, wherein said N random numbers have a jointly gaussian distribution probability.

4. The method according to claim 3, wherein said jointly gaussian distribution probability is a zero mean gaussian distribution.

5. The method according to claim 1, wherein said matrix element $C_{EDR}$ specify expected errors in the values $\theta_1, \ldots \theta_p$.

6. The method according to claim 5, wherein the expected errors in the values $\theta_1, \theta_2, \ldots \theta_p$ represent the differences in said p surface and atmospheric parameters from said initial set of values.

7. A method of predicting errors in sea surface temperature measurements based on radiance measurements I obtained from visible infra red radiometric satellite sensor (VIIRS) orbiting the earth having at least a first bandwidth and a second bandwidth corresponding to a particular window region, comprising the steps of:

applying a forward model for determining sea-surface temperature from said satellite radiance measurements I over said particular wavelength window region as $I(v,atm)=B(v,T_s)\cdot t(V,atm)+B(v,T_a)\cdot[1-t(v,atm)]$ where $T_s$ is measured sea-surface temperature, Ta represents a temperature indicative of atmospheric self-radiance in said wavelength window region, t represents a parameter indicative of transmissivity from said sea surface to the top of the atmosphere, v is a wavenumber in said window region, and atm is representative of atmospheric parameters determining the value of said transmittance at wavenumber v, and where B(V,T) is a Planck function;

approximating said transmissivity parameter t(v,atm) as $1-A_{atm}\cdot K(v)$ in said window region where K is a function only of wavenumber and where $A_{atm}$ is indicative of atmospheric parameters;

performing a straight line approximation of K(v) to obtain $K_L(V)$;

evaluating B(V,T) over a limited range of V and T parameter values to obtain $I(V,atm)=C_B$ is a constant and $\theta_s=(T_s)^n$, and $\theta_a=A_{atm}(T_a{}^n-T_s{}^n)$;

measuring noise amplitudes over said first and second bandwidths to obtain a first noise amplitude $\sigma_1$, and a second noise amplitude $\sigma_2$;

integrating said radiance function measurements I(v,atm) over said first and second bandwidths to obtain said radiance I as a function of a matrix H and a matrix $\theta$ such that $I=H\theta$, where I is a matrix function of radiances I1 and I2 corresponding to said first and second bandwidths, and $\theta$ is a matrix representation of $\theta_s$ and $\theta_a$, and where H is a function of V;

adding to said radiance I a noise matrix w corresponding to said noise amplitudes to obtain a radiance $I=H\theta+w$;

determining the covariance of said noise matrix w to obtain a covariance matrix C;

and manipulating the matrices H and C according to the equation $(H^T C^{-1}H)^{-1}$ to obtain a matrix $C_{EDR}$ having an element indicative of the expected variance in said sea surface temperature variable $T_s{}^n$.

8. The method according to claim 7, wherein said wavelength window region is 10–12 $\mu$m.

9. The method according to claim 8, wherein $T_a$ varies by less than 1 Kelvin within said 10–12 $\mu$m window.

10. The method according to claim 9, wherein said limited range over which B(V,T) is evaluated further comprises a temperature range of between 285 K and 315 K.

11. The method according to claim 10, wherein said limited range over which B(V,T) is evaluated further comprises a wavenumber range of between 800 cm$^{-1}$ and 1000 cm$^{-1}$.

12. The method according to claim 11, wherein said Planck function B(V,T) is $C_1 V^3 P(C_2 VT^{-1})$ where $C_1$ is $1.191 \times 10^{-12}$ watt/cm$^2$/sr/(cm$^{-1}$)$^4$, and where $P(C_2 VT^{-1})=1/(e^{c2VT-1}-1)$.

13. The method according to claim 7, wherein the step of approximating t(v,atm) as $1-A_{atm}\cdot K(v)$ is applied only to wide bandwidth radiance signals.

14. A method estimating an error involved in determining ice particle size of cirrus clouds using radiance measurements obtained from visible infrared radiometric satellite sensors (VIIRS) in a first and second radiance bands, said VIIRS sensors orbiting the earth and obtaining said radiance measurements from a body located on a surface of said earth, comprising the steps of:

creating a Planck function P(x) such that the value of said P(x) is 1/x when x approaches 0, and is $1/(e^x-1)$ otherwise;

determining first and second black body constants C1 and C2 associated with specifying a curve of said Planck function P(x);

determining a first parameter as a function of wavenumber $\sigma$ and temperature $\tau$;

determining a second parameter as a function of wavenumber $\sigma$ and temperature $\tau$;

determining beginning and ending wavenumbers associated with said respective first and second radiance bands;

storing an expected temperature error NEDT expected for said first band associated with the design of said VIIRS sensor and a second expected temperature error NEDT4 expected for said second band associated with the design of said VIIRS sensor;

storing first and second temperature measurement values TNEDT and TNEDT4, respectively, with each of said first and second respective radiation bands over which said expected temperature errors NEDT and NEDT4 are evaluated;

obtaining an expected measurement error $\sigma_3$ in said first band by integrating said first parameter as a function of said first expected temperature error and first temperature measurement value over said first radiance band and obtaining a second expected measurement error $\sigma_4$ associated with said second radiance band by integrating said first parameter as a function of said second expected temperature error and said second temperature measurement value over said second radiance band;

determining a set of constants A3, B3, A4, and B4 for linearizing with respect to temperature integrals over said first and second bands of said Planck black body function P(x), wherein said constant A3 comprises integrating said first parameter as a function of temperature $T_0$ over said first radiance band;

wherein said constant B3 is evaluated by integrating said second parameter at the temperature $T_0$ over said first radiance band;

wherein said A4 constant evaluated by integrating said first parameter at said temperature $T_0$ over said second radiance band;

and wherein said constant B4 is evaluated by integrating said second parameter at said temperature $T_0$ over said second radiance band;

defining a cirrus cloud ice particle size parameter L as a function of cloud temperature $T_c$ based on a plurality of constants c0, c1, c2 and c3 derived from a curve fitting of cloud data;

defining a function M as a function of said L cirrus cloud ice particle size and constant values A0, A1, and A2 for associating said dependence of M on L;

defining a derivative dM of function M with respect to L and a derivative dL of L with respect to temperature $T_c$;

defining a derivative dTM of M with respect to cirrus cloud temperature $T_c$;

determining an average emissivity of said cirrus clouds as $\epsilon_{04}$;

defining values associated with constants $f_{00}$, $f_{\epsilon 0}$, and fT0 where $f_{00}$ is characterized by the function $f_{00}=(1-\epsilon_{04})^{m(T_0)-1}$ and $f_{\epsilon 0}$ is characterized by the function $-m(T_0)(1-\epsilon_{04})^{m(T_0)-1}$ and fT0 is characterized by the function $FT0=(1-\epsilon_{04})^{m \, T_0} \cdot \ln(1\epsilon_{04}) \cdot dTM(T_0)$;

estimating the surface temperature $T_s$ and integrating said Planck function P(x) at said surface temperature Ts over each of said first and second radiance bands to obtain a first estimated radiance $I_{G3}$ associated with said first band, and a second estimated radiance $I_{G4}$ associated with said second band;

defining a matrix H having corresponding matrix elements indicative of said values fT0, $f_{\epsilon 0}$, and $f_{00}$;

determining a noise covariance matrix C based on said first and second expected measurement errors $\sigma_3$ and $\sigma_4$; determining a covariance matrix of errors in the estimation of said cirrus cloud temperature $C_\theta$ where $C_\theta$ is characterized by the equation $C_\theta=(H^T \cdot C^{-1} \cdot H)^{-1}$;

determining a standard deviation $\sigma T$ of said estimated errors in $C\theta$; and applying said $\sigma T$ to said L(Tc) particle size to obtain said estimate of error in said particle size.

15. The method according to claim 14, further comprising the step of creating a table of errors L given said above error estimate $\sigma T$ in said estimated cloud temperatures using said previously defined function L which depends on said cirrus cloud temperature.

16. The method according to claim 14, wherein said temperature measurements are measured in Kelvins.

17. The method according to claim 14, wherein said first band comprises a 3.7 $\mu$m region and where said second band comprises a 10.9 $\mu$m region radiance band.

18. The method according to claim 17, wherein said beginning and ending wave numbers in said first band are 2545 cm$^{-1}$ and 2817 cm$^{-1}$ respectively.

19. The method according to claim 18, wherein said beginning and ending wavenumbers for said second band comprise 885 cm$^{-1}$ to 971 cm$^{-1}$ respectively.

20. The method according to claim 19, wherein said first and second temperature measurement values are respectively 271 K and 293 K.

* * * * *